United States Patent [19]

Fukushima et al.

[11] Patent Number: 5,227,927
[45] Date of Patent: Jul. 13, 1993

[54] RECORDING AND/OR REPRODUCING APPARATUS ADAPTED TO MINIMIZED ELECTRICAL ENERGY CONSUMPTION

[75] Inventors: Nobuo Fukushima; Shinji Sakai; Osamu Takeda; Masahiro Takei; Yasutomo Suzuki; Tadashi Okino; Shigeru Jinnai, all of Kanagawa, Japan

[73] Assignee: Canon Kabushiki Kaisha, Tokyo, Japan

[21] Appl. No.: 966,591

[22] Filed: Oct. 26, 1992

Related U.S. Application Data

[63] Continuation of Ser. No. 549,271, Jul. 6, 1990, abandoned, which is a continuation of Ser. No. 462,102, Jan. 8, 1990, Pat. No. 5,005,088, which is a continuation of Ser. No. 356,608, May 24, 1989, abandoned, which is a continuation of Ser. No. 51,477, May 18, 1987, abandoned.

[30] Foreign Application Priority Data

| May 21, 1986 | [JP] | Japan | 61-116955 |
| May 21, 1986 | [JP] | Japan | 61-116956 |
| May 21, 1986 | [JP] | Japan | 61-116957 |
| May 21, 1986 | [JP] | Japan | 61-116958 |
| May 21, 1986 | [JP] | Japan | 61-116959 |
| May 21, 1986 | [JP] | Japan | 61-116964 |
| May 21, 1986 | [JP] | Japan | 61-116983 |
| May 21, 1986 | [JP] | Japan | 61-116984 |
| May 21, 1986 | [JP] | Japan | 61-116986 |

[51] Int. Cl.$^5$ ............... G11B 15/18; G11B 19/02; H04N 5/78
[52] U.S. Cl. .................... 360/69; 360/71; 360/35.1; 358/909
[58] Field of Search .............. 360/69, 71, 73.3, 74.1, 360/8, 9.1, 10.1, 35.1; 358/909

[56] References Cited

U.S. PATENT DOCUMENTS

| 4,376,293 | 3/1983 | Teramura et al. | 360/71 |
| 4,413,291 | 11/1983 | Ueki et al. | 360/71 |
| 4,644,426 | 2/1987 | Saito | 360/71 |
| 4,658,307 | 4/1987 | Tsuyuguchi et al. | 360/71 X |
| 5,016,124 | 5/1991 | Fukushima et al. | 360/69 |
| 5,053,896 | 10/1991 | Sakata et al. | 360/71 |

*Primary Examiner*—Andrew L. Sniezek
*Attorney, Agent, or Firm*—Robin, Blecker, Daley & Driscoll

[57] ABSTRACT

A recording and/or reproducing apparatus arranged to permit an interchange of record bearing media and selection between recording and reproducing modes of operation on the medium comprises look-up device for looking up the presence or absence of an existing record in each recording or reproducing position on the record bearing medium loaded on the apparatus, and control unit arranged to control the look-up device to cause it to perform a look-up action in response to opening of a lid for replacement of the record bearing medium and to cut off the power supply upon completion of the look-up action. The control unit thus lowers electric energy consumption and saves electric energy from being wasted by the look-up action.

11 Claims, 21 Drawing Sheets

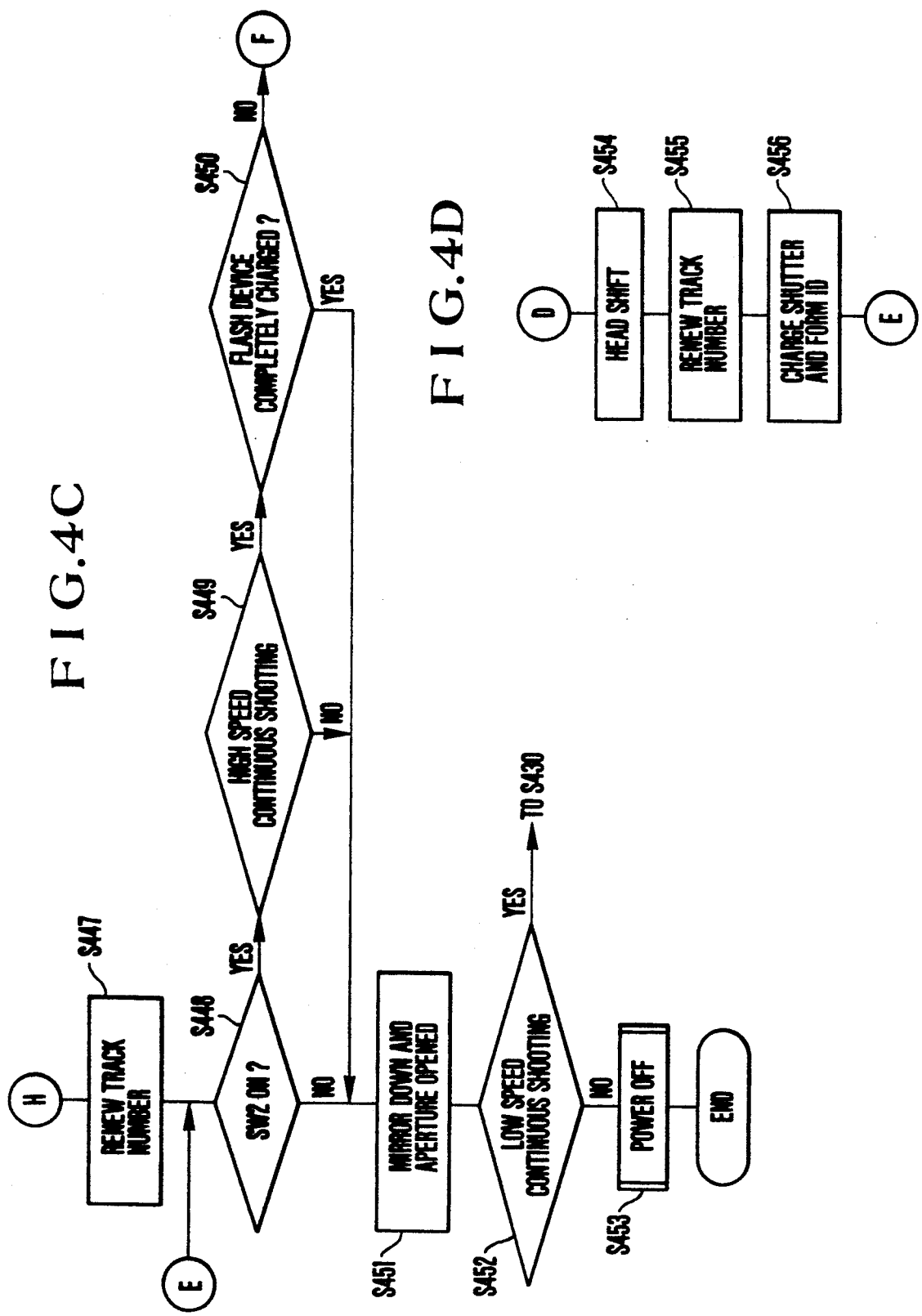

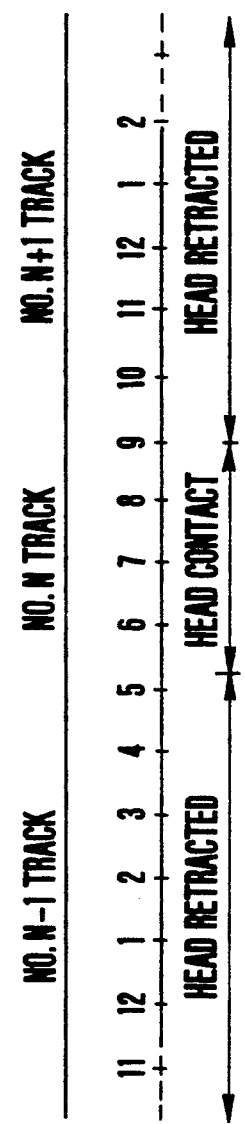
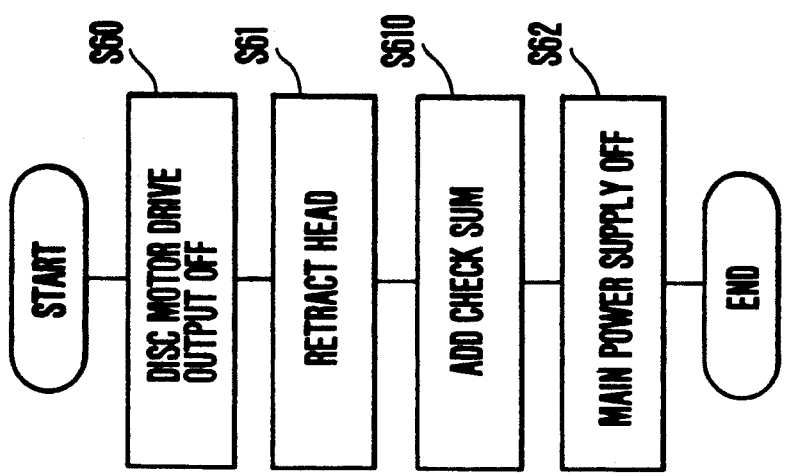

FIG.14
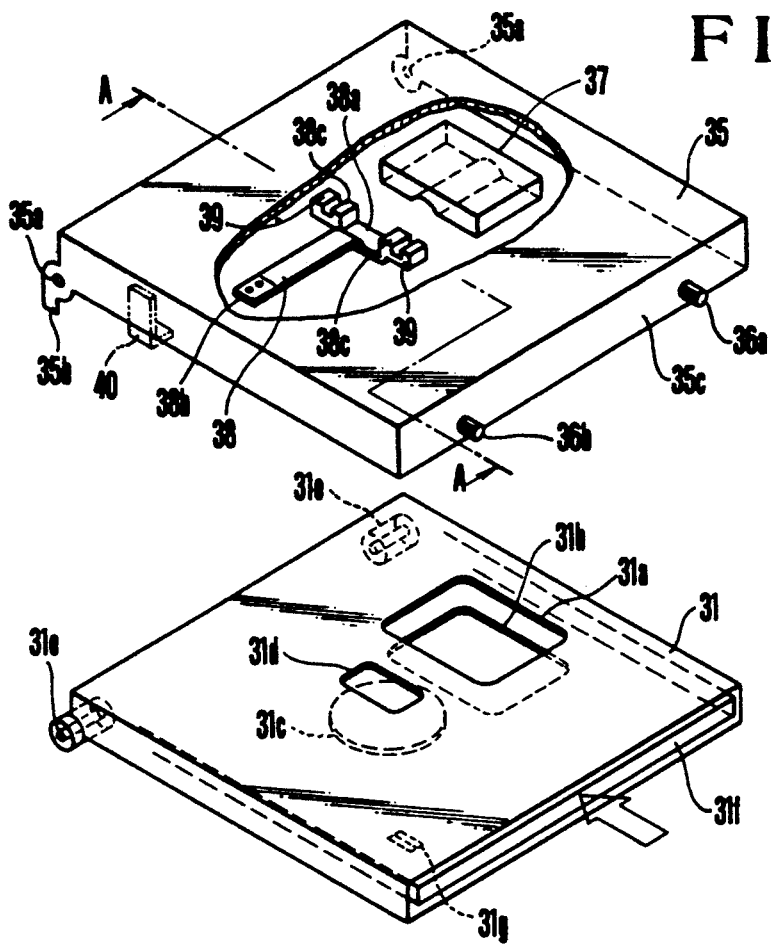
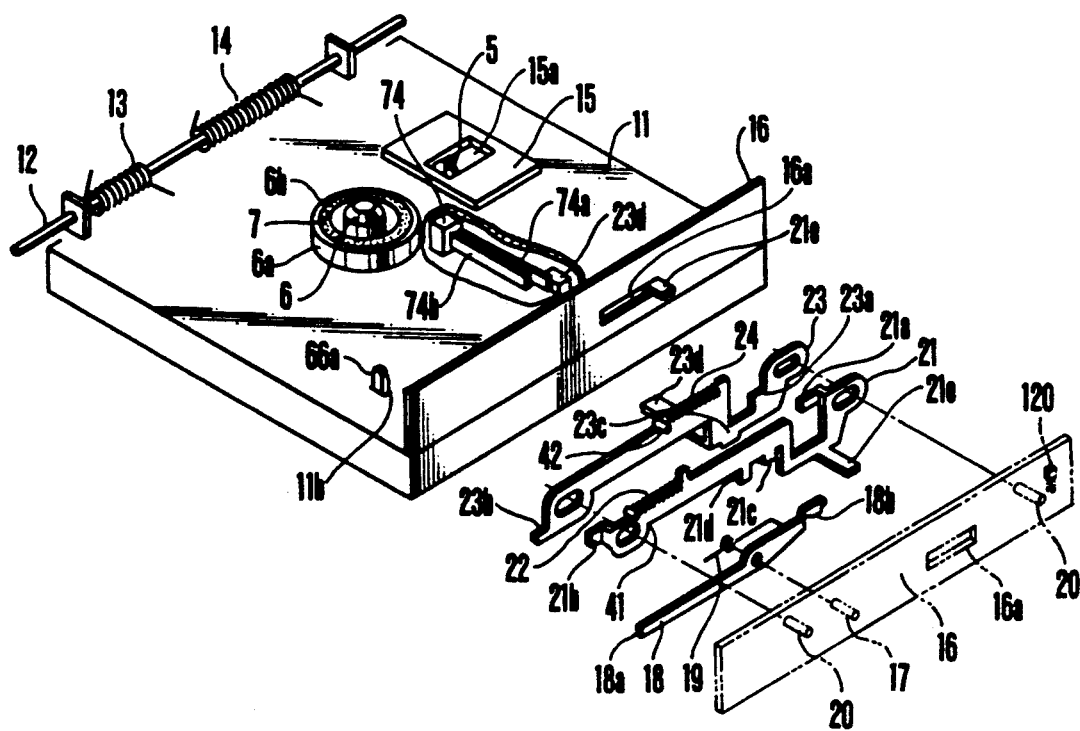

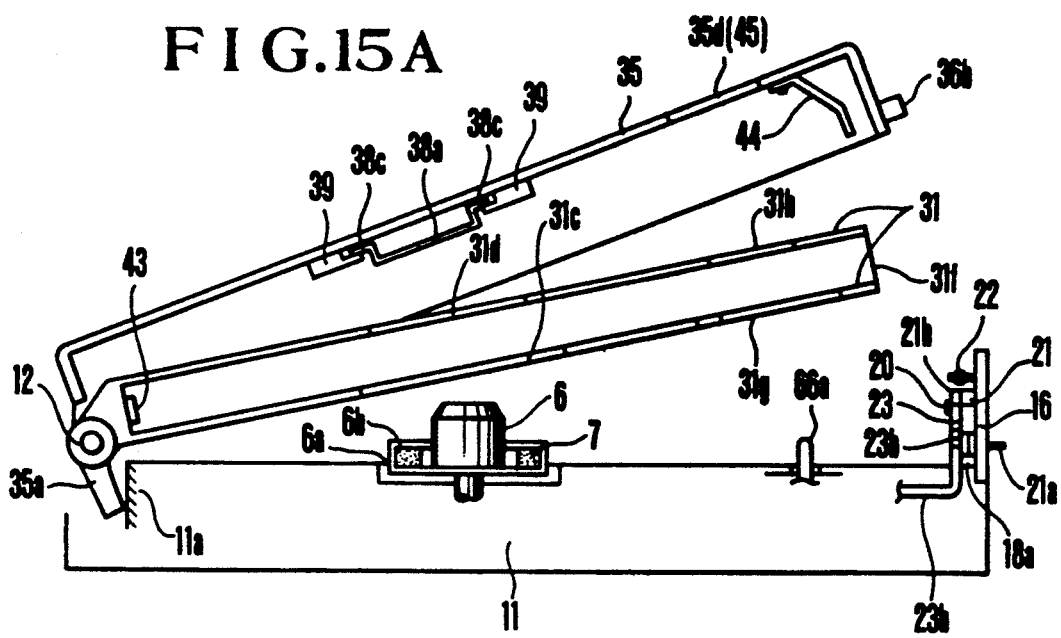
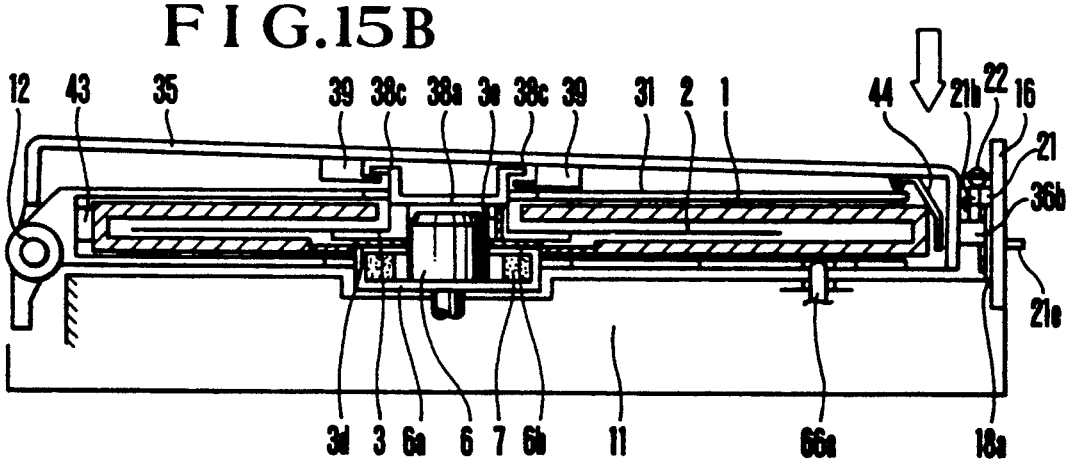
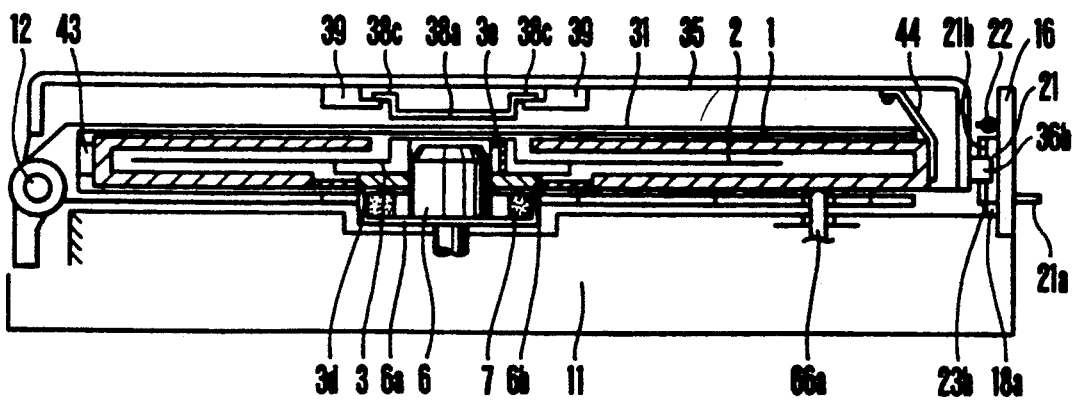

RECORDING AND/OR REPRODUCING APPARATUS ADAPTED TO MINIMIZED ELECTRICAL ENERGY CONSUMPTION

This is a continuation application under 37 CFR 1.62 of prior application Ser. No. 549,271, filed Jul. 6, 1990, which is a continuation of Ser. No. 462102 filed Jan. 2, 1990, now U.S. Pat. No. 5,005,088 which is a continuation of Ser. No. 356,608 filed May 24, 1989, now abandoned which is a continuation of Ser. No. 051,477 filed May 18, 1987, now abandoned.

BACKGROUND OF THE INVENTION

1. Field of the Invention

This invention relates to a recording and/or reproducing apparatus having a high fail-safe effect.

2. Description of the Related Art

In the recording apparatus of the kind arranged to use a rotary record bearing medium, such as a magnetic disc or a magnetic drum and to record by means of a moving head a unit length of information, such as one field or frame portion of a video signal, in each of recording tracks which are formed in a concentric or annular shape on the medium according as the information is recorded, the head must be correctly positioned on the medium at an unrecorded part thereof before recording the information in order to avoid double or overlapped recording.

In view of this, some of known apparatuses of the above stated kind have been arranged to detect prior to recording the presence or absence of any record in each recording position on the record bearing medium; to shift the head to a next recording position in the event of detection of any existing record; to repeatedly perform the head shifting action as necessary before the head comes to a desired unrecorded part on the medium; and to permit recording after the head is correctly positioned. Such arrangement has been disclosed, for example, in Japanese Patent Application Laid-Open No. SHO 54-140516 and in U.S. patent application Ser. No. 030,930, filed Apr. 17, 1979 now abandoned and assigned to the assignee of the present invention.

In the case of the apparatus arranged in the above stated manner, if a control sequence is set up, for example, to shift the head to a next recording position either upon completion of recording in one recording position or before recording in the next position, the present position on the record bearing medium of the head would serve as a memory relative to the next recording position on the medium. Therefore, even when the power supply for the apparatus is switched off or, in the event of a portable apparatus, when the power source battery thereof is taken out for replacement or charging or when the battery voltage drops to an unserviceable level lower than a threshold value, the possibility of any double recording on the same medium can be eliminated and also further recording can be accomplished without leaving any unnecessary unrecorded part (or a vacant track or tracks) on the basis of the present position of the head as long as the head has not been moved from the present position during an interval time between the present recording and further recording.

However, if the record bearing medium is replaced with another record bearing medium while the power supply is somehow cut off, the present head position becomes totally meaningless. Therefore, recording under this condition might result either in a double record, overlapped records or vacant tracks. To avoid such inconvenience, the head must be positioned at an unrecorded part on the record bearing medium every time the power supply is switched on. However, this head positioning action is meaningless in cases where the record bearing medium remains unreplaced. Besides, it impairs by and large the quick recording operability of the apparatus (corresponding to the so-called quick shooting operability of cameras). Further, in the case of a portable type apparatus, the consumption of the power source battery is quickened by such arrangement. A problem similar to this likely arises in the case of an apparatus arranged to necessitate readjustment of recording conditions such as change-over of the head to be used from one head over to another according to the properties and kind of the record bearing medium.

To solve this problem, there has been proposed a recording apparatus which permits an interchange of record bearing media and is equipped with some means for mechanically memorizing and storing information on that a record bearing medium has been taken out or replaced with a new record bearing medium. The details of this apparatus are as disclosed in U.S. patent application Ser. No. 826,117, which was filed Feb. 5, 1986, now abandoned assigned to the assignee of the present invention and corresponding to Japanese Patent Application No. SHO 60-22633. When the record bearing medium is replaced with another medium, the above stated memory means mechanically memorizes this fact. In next recording, confirmation is made on the basis of the content of the mechanical memory means as to whether the record bearing medium has been replaced. Then, a head resetting action for readjustment of the position of the head to an unrecorded part of the medium is performed only when the fact that the medium has been replaced is thus confirmed.

In that instance, however, if this mechanical memory means is reset before detection of a recordable part of the record bearing medium, occurrence of some power supply trouble (consumption, replacement, or a temporarily cut off state due to an erroneous operation of the battery) or mixing-in of some external noise or the like before detection of the recordable part would make an adequate head positioning action impossible.

Further, in resetting the head at an unrecorded part in the above stated manner to initialize thereby the apparatus in the recording mode, generally a considerably long period of time is required before the start of an actual image sensing recording operation. During this period, therefore, the power source is generally consumed to a great degree. Whereas, there is a strong desire to have the apparatus arranged to enable the operator to monitor a picked-up image of an object immediately after completion of the initializing process.

Further, a recording apparatus of the above stated kind necessitates a power supply, like a still picture camera. However, in taking out the record bearing medium, if the power supply is not switched on, the head would remain at an unrecorded part of the record bearing medium. Under that condition, the medium taking-out action would injure the head. Further, when another record bearing medium is inserted in place of the medium taken out, the head is located at a part corresponding to a first unrecorded part of the previous medium as viewed from the outer circumferential side thereof. Therefore, after a release switch is pushed, a look-up action must be performed for a first unrecorded part of the newly inserted medium. While the image sensing or recording apparatus is usable without any other devices for image sensing and recording, it can be variously arranged, for example, to be capable of performing a reproducing function and/or to permit remote control over illumination, etc. by connecting some adapter and some accessory to the apparatus.

In such a case, the adapter and the accessory consume some amount of electric energy. If they are provided with no battery for their own use but are arranged to receive a power supply from the power source of the apparatus, then, this presents a problem with regard to the timing of the power supply, because: Constant power supply would shorten the life of the battery, would cause corrosion of connectors. It also would shorten the serviceable life of electric parts and degrade the reliability of them. Some of these problems would remain unsolved even if the adapter and the accessory is provided with some power source for their own use.

Further, in accordance with the head positioning method mentioned above, if some recording track is erased in an intermediate part of the record bearing medium, the head is first positioned for the erased track. In this instance, the head is shifted to a next recording position after completion of recording in the first position. Then, in shifting the head to the next position, the presence or absence of an existing record is also examined and determined. In other words, in the event of a vacant track located in an intermediate part, in order to avoid double recording, a check must be made for the presence or absence of any existing record every time the head is shifted. In that event, an excessively long period of time is required before next recording becomes possible with the head shifted to an unrecorded part. Then, a recording chance (corresponding to the so-called shutter chance of a camera) would be missed or continuous recording, such as a continuous still video recording for several consecutive fields of frames, would become impossible because of such a long period of time.

SUMMARY OF THE INVENTION

It is a general object of this invention to provide an image recording and/or reproducing apparatus which solves all or some of the problems of the prior art described in the foregoing.

It is a more specific object of this invention to provide an image recording and/or reproducing apparatus which is arranged to suppress electric energy consumption to a low level.

It is another specific object of this invention to provide a recording apparatus which is arranged to enable the head thereof to automatically have access to an unrecorded part of a record bearing medium without wasting the electric energy for that purpose.

Under this object, a recording and/or reproducing apparatus arranged as a preferred embodiment of this invention to permit replacement of a record bearing medium and to permit selection of a recording or reproducing mode of operation on the record bearing medium comprises look-up means for looking up the presence or absence of an existing record in each recording or reproducing part of the medium; and control means which is arranged to render the look-up means operative when a lid or cover is opened for replacement of the record bearing medium and to cut off a power supply upon completion of the look-up action of the look-up means, so that electric energy consumption can be lowered and particularly energy consumption by the look-up means can be minimized.

It is a further object of this invention to provide a recording and/or reproducing apparatus which is capable of promptly performing a look-up action by look-up means for detection of the presence or absence of an existing record on a record bearing medium.

Under that object, a recording and/or reproducing apparatus arranged as a preferred embodiment of this invention is provided with a discriminating device which comprises: detecting means for detecting the signal level of each of recording tracks by examining it along the track; and discriminating means arranged to determine the presence of an existing record in the recording track if the result of detection by the detecting means reaches a predetermined reference level before the signal level detection is made for the whole of the recording track.

It is a further object of this invention to provide a recording apparatus which is capable of always accurately bringing a recording head to an unrecorded part of a record bearing medium even in the event of having an external noise mixed in.

It is a further object of this invention to provide a recording apparatus which is capable of always accurately bringing a recording head to an unrecorded part of a record bearing medium even when the power supply means thereof is in disorder.

Under this object, a recording and/or reproducing apparatus arranged as a preferred embodiment of this invention to permit an interchange of record bearing media comprises: look-up means for looking up the presence or absence of an existing record in each of recording positions on a record bearing medium loaded on the apparatus; memory means arranged to store the result of look-up performed by the look-up means and also to store a check code along with the result of look-up; and control means arranged to discriminate the check code stored by the memory means and to cause the look-up means to perform once again in the event of an abnormality indicated by the check code due to a disorder in power supply, an external noise, etc.

It is a further object of this invention to provide a recording and/or reproducing apparatus which has a recording mode and a reproducing mode and is capable of adequately operating even after change-over from the recording mode to the reproducing mode and vice versa.

Under that object, a recording and/or reproducing apparatus is arranged according to this invention to enable the operator to reproduce and confirm recorded information immediately after recording by just switching the apparatus from a recording mode over to a reproducing mode.

It is a further object of this invention to provide a recording and/or reproducing apparatus which is capable of accurately and reliably bringing a recording head to an unrecorded part of a record bearing medium in response to switching from a reproducing mode over to a recording mode.

Under this object, a recording and/or reproducing apparatus which is arranged as a preferred embodiment of this invention to permit an interchange of record bearing media and to permit selection between recording and reproducing modes of operation on the record bearing medium comprises: look-up means for looking up the presence or absence of an existing record in each recording or reproducing position on the record bearing medium loaded on the apparatus; and a control means for controlling the look-up means to cause it to perform the look-up action thereof in response to change-over from the reproducing mode to the recording mode of the apparatus.

It is a still further object of this invention to provide a recording apparatus which is arranged to prevent any damage that might occur due to contact between a record bearing medium and a recording head in taking out the record bearing medium from the apparatus.

Under the above stated object, a recording apparatus which is arranged as a preferred embodiment of this invention comprises instructing means arranged to give an instruction for ejecting a cassette; control means for keeping a power supply over a predetermined period of time in accordance with the instruction of the instructing means even when the power supply is switched off; and means for retracting a recording head by utilizing the power supply turned on in response to the cassette ejecting instruction, so that the recording head and the record bearing medium can be prevented from being damaged when the medium is taken out after the power supply is switched off.

These and further objects and features of this invention will become apparent from the following detailed description of embodiments thereof taken in connection with the accompanying drawings.

BRIEF DESCRIPTION OF THE DRAWINGS

FIGS. 3 to 10 are flow charts showing the operation of a first embodiment of this invention. Of these drawings:

FIG. 3 is a flow chart showing the start of an image sensing action.

FIGS. 4A to 4D are flow charts showing operations in a recording mode.

FIG. 5 is a flow chart showing an operation in a reproducing mode.

FIG. 6 is a flow chart showing an operation performed in switching the power supply off.

FIG. 7 is an illustration showing the details of the operation of FIG. 6.

FIG. 8 is a flow chart showing a motor stop check routine.

FIGS. 9 and 10 are flow charts showing recording initializing operations.

FIG. 14 is an exploded oblique view showing a cassette loading and disc loading device of an embodiment of this invention.

FIGS. 15A, 15B and 15C are sectional views taken along the line A—A of FIG. 14 respectively showing the device of FIG. 14 as in varied states thereof.

DETAILED DESCRIPTION OF PREFERRED EMBODIMENTS

Figure 1:
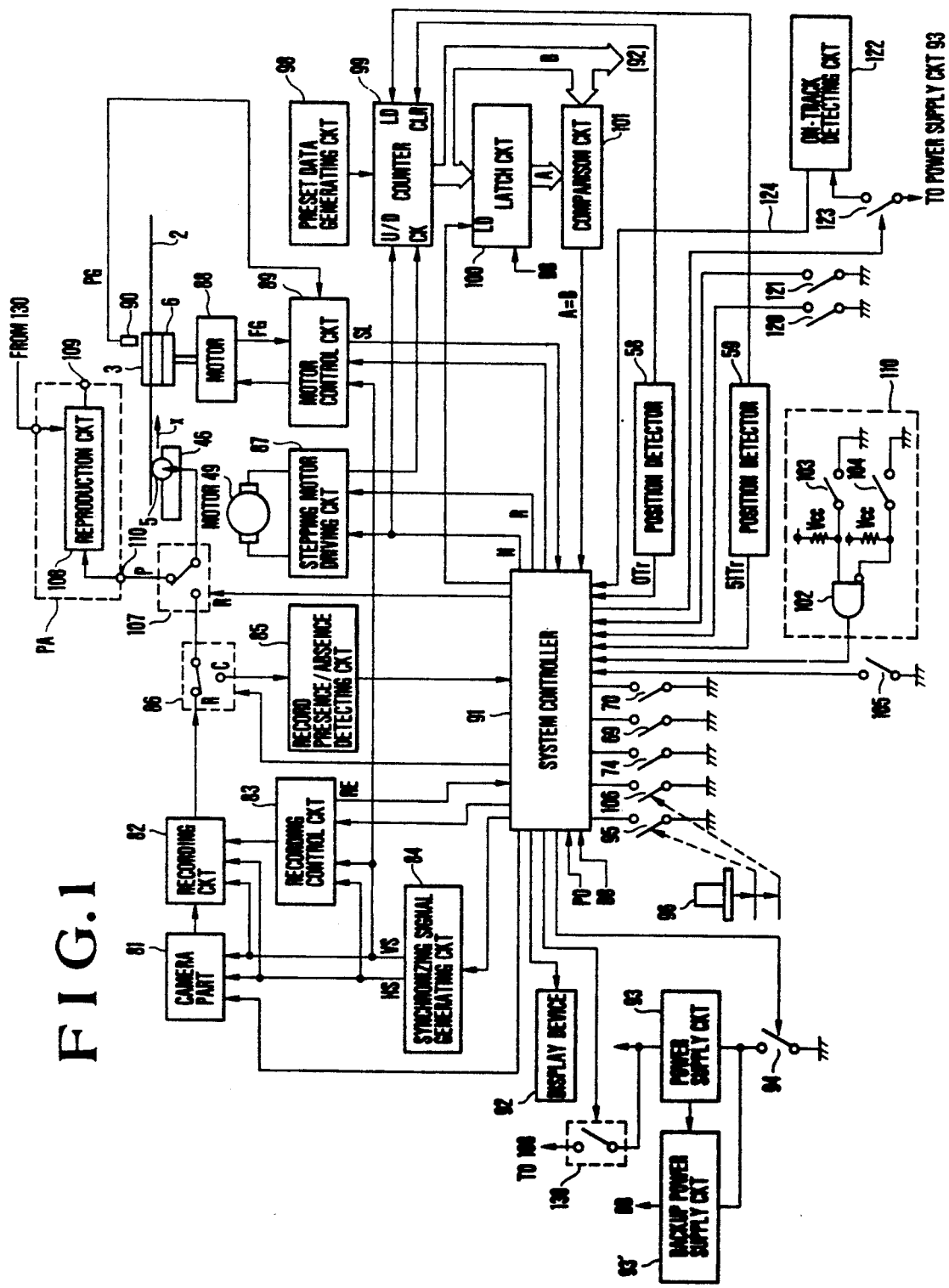
FIG. 1 is a block diagram showing an arrangement made in accordance with this invention.

Referring to FIG. 1, a recording and/or reproducing apparatus embodying this invention and particularly its electrical circuit system is arranged as follows: In the case of this embodiment, this invention is applied to a still video recording apparatus. The illustration includes a camera part 81 which is arranged in a known manner to form a video signal; a recording circuit 82 arranged to record the video signal from the camera part 81 on a disc 2 via a head 5; a recording control circuit 83 arranged to control and cause the recording circuit 82 to record either one field or one frame portion of the video signal; and a synchronizing signal generating circuit 84 arranged to generate horizontal and vertical synchronizing signals HS and VS. The output of the circuit 84 is arranged to be applied to the camera part 81, the recording circuit 82, the recording control circuit 83 and a disc motor control circuit 89 which will be described later herein. Further, the recording control circuit 83 is arranged to produce a recording control end signal RE upon completion of recording by the head 5.

A record presence/absence detecting circuit 85 is arranged to detect via the head 5 the presence or absence of an existing record of video signal in each recording position on the disc 2. A change-over switch 86 is arranged to switch the connection of the head 5 between the output terminal of the recording circuit 82 (via the terminal R of the switch) and the input terminal of the detecting circuit 85 (via its terminal C). A switch 107 is arranged either to supply the recording or reproducing head 5 with a recording signal or to supply a reproduction circuit 108 with a reproduced signal from the head 5 via a terminal 110. The output of the reproduction circuit 108 is obtained from a terminal 109 in the form of a television signal. The reproduction circuit 108 and the terminals 109 and 110 may be arranged to be included in a reproduction adapter PA. In that event, the reproduction adapter PA is arranged to be attachable and detachable to and from the apparatus. Further, the reproduction circuit 108 which is disposed within the adapter PA in that event is arranged to receive power supply through a switch 130 under the control of a system controller 91.

A stepping motor driving circuit 87 is arranged to drive a stepping motor 49 for driving the head. A disc rotating motor 88 is arranged to rotate the disc 2 via a spindle 6. A disc motor control circuit 89 is arranged to control the motor 88. In this case, the circuit 89 is arranged to control the motor 88 on the basis of a reference speed signal produced by a reference signal oscillator disposed within the circuit 89, a rotating speed signal FG coming from the motor 88, a vertical synchronizing signal VS from the synchronizing signal generating circuit 84 and a disc rotation phase signal PG coming from a disc rotation phase detector 90 which detects a magnetized pin 3e buried in the center core 3 of the disc 2. The motor 88 is controlled in such a manner that it rotates at a speed corresponding to the field or frame frequency of the television signal, i.e. 3,600 or 1,800 rpm in the case of the NTSC system, and rotates at a predetermined phase relative to the timing of the vertical synchronizing signal VS. This control circuit 89 is further arranged to produce a servo lock-in signal SL at a point of time when the motor 88 comes to rotate at the predetermined speed and phase.

The embodiment is provided with a cassette take out switch 120; and a recording preventing claw detecting switch 121 arranged to detect a recording preventing claw which is not shown but is provided on the cassette containing the disc 2. An on-track detecting circuit 122 is arranged to detect whether or not the head 5 is accurately tracing each recording track. For this purpose, the circuit 122 is provided with a photo-sensor which is arranged to detect a hole corresponding to the position of each recording track. A power supply switch 123 is arranged for the on-track detecting circuit 122. A high level on-track signal 124 is arranged to be produced when the head comes to accurately trace the track (hereinafter referred to as an on-track state). The on-track signal will be described in further detail later with reference to FIG. 7.

The system controller 91 is arranged to control the whole circuit system of FIG. 1 on the basis of the outputs of first and second recording trigger switches 95 and 106 which will be described later; those of a cassette presence/absence detecting switch 69, a cassette mounting/dismounting detecting switch 70, an outer cover lock completion detecting switch 74, carrier position detectors 58 and 59, the cassette take out switch 120, the recording preventing claw detecting switch 121, the on-track detecting circuit 122; the on-track detecting circuit power supply switch 123; the on-track signal 124; the recording end signal RE from the recording control circuit 83; the servo lock-in signal SL from the motor control circuit 89; and a power-on signal PO obtained when the power supply is switched on.

The circuit system includes a display device 92 which includes a light or sound emitting element; a power supply circuit 93 which includes a battery; a backup (or auxiliary) power supply circuit 93' which includes a capacitor; a power supply switch 94; a first recording trigger switch 95; a second recording trigger switch 106; and a trigger button 96, which turns on the first recording trigger switch 95 when it is pushed down to the end of a first step stroke and turns on the second recording trigger switch 106 when it is pushed down to the end of a second step stroke.

The record presence/absence detecting circuit 85 is arranged to detect the presence or absence of a radio frequency (RF) signal in case that the recording signal is, for example, a frequency modulated signal. In the event of detection of an existing record, the circuit 85 produces a high level signal. The backup power supply circuit 93' is arranged to charge its capacitor with electric energy upon receipt of a power supply from the power supply circuit 93 with the power supply switch 94 turned on; to supply the charged electric energy to applicable circuits, including at least the controller 91 and a latch circuit 100, in response to turning off of the switch 94; and to have a capacity for scores of minutes to several hours.

A counter 99 is arranged to count driving pulses coming from the stepping motor driving circuit 87. The counter 99 up counts the pulses when the stepping motor 49 is driven to rotate forward (to move a head carrier 46 in the direction of arrow X) in accordance with a control signal from the controller and down counts the pulses when the stepping motor is driven to rotate backward (to move the head carrier 46 in the direction reverse to the direction of arrow X). The count of the counter is cleared when the carrier position detector 58 which is arranged to detect a 0-th track turns off and is preset at "51" produced from a preset data generating circuit 98 when carrier position detector 59 which is arranged to detect a 51st track turns off.

The latch circuit 100 is arranged to latch the content of the counter 99 in response to a load instruction produced from the controller 91. The latch circuit 100 thus serves as means for electrically storing the result of look-up for the presence or absence of an existing record. The circuit 100 is operated by the power supply from the backup power supply circuit 93'. A comparison circuit 101 is arranged to compare the content A of the latch circuit 100 and the content B of the counter 99. When the result of comparison is A=B, the comparison circuit 101 produces a high level output, which is supplied to the controller 91. As will be described later with reference to FIG. 2 and ensuing drawings, the system controller 91 is arranged to control also the power supply switch 94 by software.

A recording/reproducing mode setting switch 105 is provided on the body of the apparatus. For example, the switch is turned on in selecting the recording mode and turned off in selecting the reproducing mode. A block 110 represents a remote control device for remote control over the recording and reproducing operations of the apparatus through the system controller 91. Mode setting by this remote control device has priority over mode setting by the switch 105. The details of the remote control device 110 are as described below:

When a remote control operation switch 104 is turned on, an AND circuit 102 opens. The output of a recording/reproducing mode selection switch 103 is supplied via the AND circuit 102 to the system controller 91. The mode setting by this ON-OFF operating switch is arranged to control the mode on the side of the apparatus body taking priority over the mode setting operation of the switch 105.

The cassette presence/absence detecting switch 69 turns on if a cassette is loaded and set in a recordable or reproducible position. If not, it remains off. The outer cover lock completion detecting switch 74 is in an OFF position when a cover which is not shown but is arranged to be normally closed and to open in replacing the cassette is open and is in an ON position when the cover is closed. The cassette loading/unloading detecting switch 70 is in an OFF position when the cassette is not loaded in a recordable or reproducible position. The switch 70 is arranged to turn off upon completion of some initial setting action (such as a recorded track detecting action) even with the cassette loaded in the recordable or reproducible position. In combination with the ON and OFF positions of other switches 69 and 74, the switch 70 mechanically stores information as to whether the cassette is replaced or not after the above stated initial setting action. More specifically, with the power supply switched on to close the cover, if the switch 70 is in its ON position, it indicates that the cassette has been replaced while the power supply is off. When the switch 69 is ON and the switch 70 is OFF with the cover in a closed state, it indicates that the cassette has not been replaced while the power supply is off. If both the switches 69 and 70 are in OFF positions with the cover in a closed state, it indicates that the apparatus is loaded with no cassette.

The detectors 58 and 59 are arranged to detect that the head 5 comes out of a given recording areas on the disc 2 on the outer and inner peripheral sides of the disc 2. These detectors 58 and 59 are provided with known photo couplers and are arranged to detect a light shielding plate mounted on the carrier 46. The following description is given on the assumption that, in the above stated recording area on the disc 2, a total of 50 recording tracks can be set at a track pitch of, say, 100 μm; and these tracks are numbered "1" to "50" in sequence from the outer peripheral side toward the center of the disc 2. In this case, the detector 58 is arranged to detect the light shielding plate when the head 5 is shifted further outward to an extent corresponding to one track pitch from the first track position (hereinafter this outward shifted position of the head 5 will be called the 0-th track position). Further, the other detector 59 is arranged to detect the light shielding plate when the head 5 is shifted one track pitch further inward from the 50th track position (hereinafter the inward shifted position will be called the 51st track position).

Figure 2:
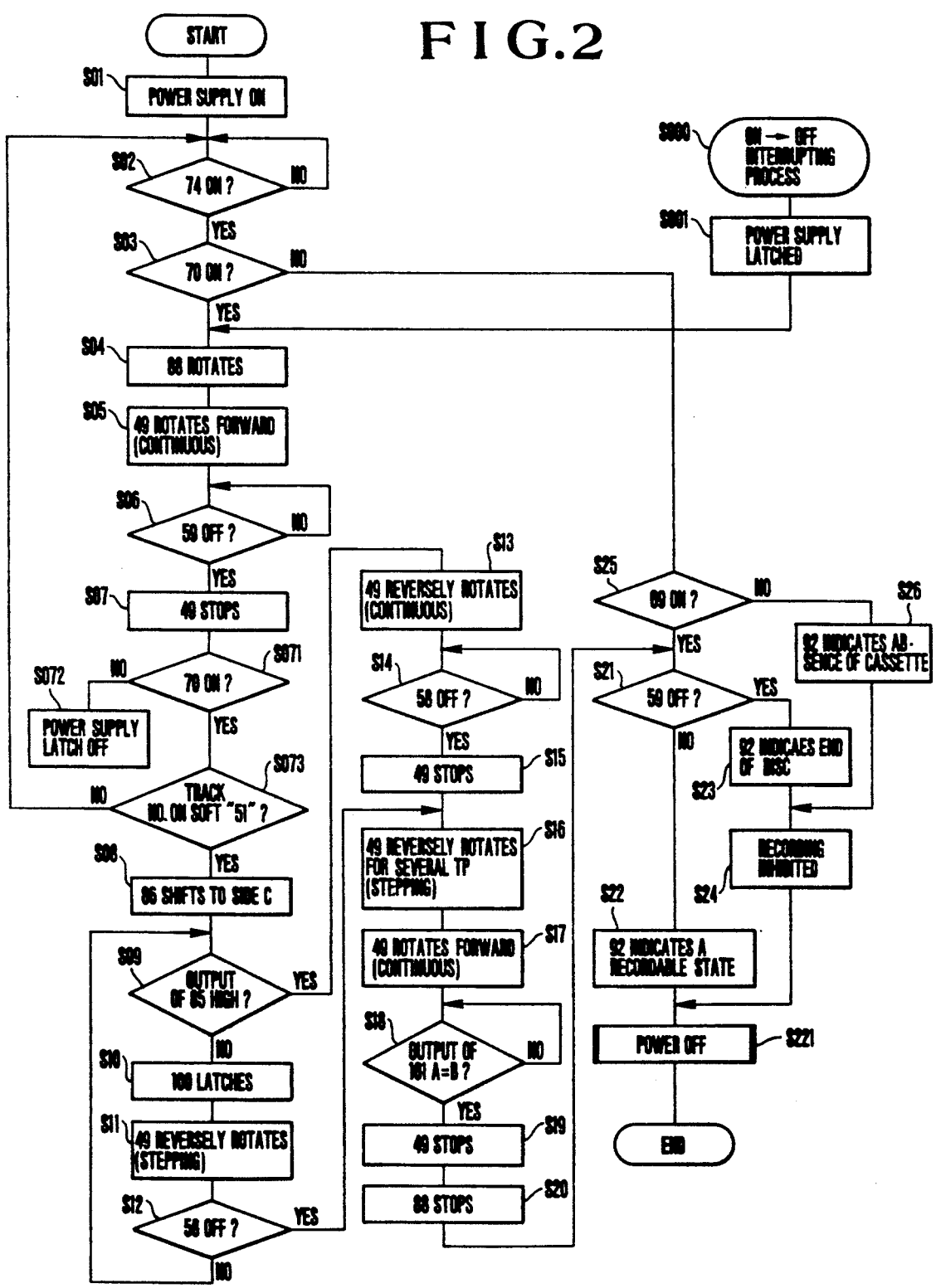
FIG. 2 is a flow chart showing a basic initializing operation for recording.

The system controller 91 mainly comprises a microcomputer, etc. The controller 91 is arranged to have a power supply also from the backup power supply circuit 93' in addition to the power supply from the power supply circuit 93. Its operation which is arranged as a first embodiment of this invention is as described below with reference to the flow chart of FIG. 2:

With the apparatus arranged as described above, when the operator pushes the button 96 down to the end of its first step stroke after turning on the power supply switch 94, the first recording trigger switch 95 turns on. Then, a preparatory operation for recording is performed as shown in FIG. 2 in the following manner:

Step S01: The power supply is switched on. Step S02: The system controller 91 makes a check to see if the outer cover lock completion detecting switch 74 is in its ON state thus indicating that the outer cover is closed. If not, the operation flow of the controller 91 waits until the switch 74 turns on. If it is found in an ON state, the flow comes to a step S03. Step S03: A check is made to see if the cassette loading/unloading detecting switch 70 is in an ON state. If it is in the ON state, it indicates that the cassette 1 has been replaced. In this case, therefore, the head 5 is automatically positioned at an unrecorded place on the disc 2. If the head 5 is shifted while the disc 2 is in repose, the recording surface of the disc 2 tends to be damaged. To avoid this, the controller 91 instructs the disc motor control circuit 89 to actuate the motor 88. Step S04: In response to the instruction, the motor rotates. Step S05: Then, the stepping motor driving circuit 87 is instructed to continuously rotate the stepping motor 49 forward. The motor 49 comes to make continuous forward rotation. By this, the head 5 is continuously shifted toward the center of the disc 2, i.e. in the direction of arrow X as shown in FIG. 1. Step S06: Meanwhile, the controller 91 repeatedly makes a check to see if the carrier position detector 59 is turned off by the arrival of the head 5 at the above stated 51st track position. Step S07: When the detector 59 turns off, an instruction is given for temporarily bringing the motor 49 to a stop. Following this, if the switch 70 is in an ON state at a step S071, the flow comes to a step S073. If not, the power supply latch is turned off at a step S072.

Step S073: If the switch 70 is in an ON state, the system controller 91 checks the counter 99 if the content of the counter indicates the track number "51" in terms of the software. If not, the flow comes back to the step S02 to repeat the initializing process. A warning may be given if there obtains an abnormal state of the apparatus after this process is repeated several times. Therefore, even if the head position information obtained from the head shift signal disagrees with an actual head position due to a noise or the like, the arrangement of this embodiment precludes the possibility of signal recording in a wrong track.

Step S08: If the content of the counter 99 is "51", the controller 91 shifts the connecting position of the change-over switch 86 to the terminal C thereof. Step S09: The output of the record presence/absence detecting circuit 85 is checked under this condition. Step S10: If the output of the circuit 85 is not at a high level, the output of the counter 99 is temporarily latched by the latch circuit 100. Step S11: After that, an instruction is given for reverse rotation by one step of the stepping motor 49. Following this, this action is repeated until the output level of the detecting circuit 85 becomes high or the carrier detector 58 turns off with the head 5 having arrived at the 0-th track position at a step S12. The record presence/absence detecting circuit 85 is arranged to detect the presence or absence of any existing signal record on the disc 2 on the basis of a signal picked up by the head 5. The circuit 85 produces a high level signal in the event of presence of an existing record and a low level signal in the event of absence. Further, the counter 99 down counts by one every time the stepping motor 49 reversely rotates one step.

Step S13: In the operation described above, if the output level of the detecting circuit 85 becomes high at the step S09 when the head is at an intermediate track, the system controller 91 gives an instruction for continuous reverse rotation of the motor 49. Step S14: Meanwhile, a check is made to see if the carrier position detector 58 has turned off. Step S15: When the detector 58 turns off, an instruction is given to bring the motor 49 to a stop. By this, the head 5 is set in the 0-th track position. The counter 99 is cleared. The content of the counter becomes "0". At that time, the latch circuit 100 retains data of the track number of an unrecorded track located next to the last recorded track as viewed from the 0-th track.

After the motor 49 is stopped at the step S15, the flow of operation of the controller 91 shifts to a next step S16 to give an instruction for reverse rotation of the motor 49 to an extent corresponding to several track pitches (hereinafter referred to as TPs). In this instance, if the detector 58 has been found to be in an OFF state at the previous step S12, the flow shifts from the step S12 directly to the step S16 without executing the steps S13, S14 and S15. Further, in this case, the content of the latch circuit 100 is at "1". The counter 99 of course has been cleared and the content thereof is at "0" also in this case. In case that the 50th track has an existing record therein, the flow comes to the step S13 after making its round of steps S09-S10-S11-S12-S09. In that case, therefore, the content of the latch circuit 100 is at "51"

and no recording is performed in the 51st track. Further, the content of the latch circuit 100 then indicates the position of a track located next to and further inward from the last recorded track.

At Step S16: the controller 91 instructs the driving circuit 87 to cause the motor 49 to make stepwise reverse rotation to an extent corresponding to several TPs to shift thereby the head 5 in the direction reverse to the direction of arrow X.

Step S17: After the reverse rotation of the stepping motor 49 to the extent of several TPs, the controller 91 this time gives an instruction for continuous forward rotation of the same motor 49 to shift thereby the head 5 in the direction of arrow X. Step S18: In the meantime, a check is made for the output A=B of the comparison circuit 101. Then, the counter 99 up counts to have its content incremented one by one from "0" according as the stepping motor 49 rotates forward. In other words, the content of the counter 99 always indicates the position of the head 5 on the disc 2 and thus gives a track signal. When the number assigned to a track to which the head 5 is presently opposed comes to coincide with the content of the latch circuit 100, the comparison circuit 101 produces its output A=B at a high level. Step S19: When the level of the A=B output of the comparison circuit 101 becomes high at the step S18, the controller 91 gives an instruction for stopping the motor 49. The head 5 is thus set in a track position indicated by the data retained at the latch circuit 100. In other words, the head is positioned at a track (unrecorded) which is located next to the last recorded track as viewed from the 0-th track.

Step S20: The controller 91 then gives an instruction to bring the disc motor 88 to a stop. Step S21: After that a check is made to see if the carrier position detector 59 is in an OFF state. Step S22: If not, the display device 92 is caused to make a display indicating a recordable state, or completion of preparation for recording. Step 23: In case that the detector 59 is in the OFF state, the display device 92 is caused to make a display indicating completion of recording in the 50th track on the disc 2 (or the end of the disc). Step S24: Further recording is inhibited.

Meanwhile, if the cassette loading/unloading detecting switch 70 is found not in an ON state at the step S03, it indicates either that the cassette 1 (see FIG. 13) is not replaced (no loading and unloading) or that the apparatus is loaded with no cassette. Step S25: In that event, therefore, the controller 91 checks the cassette presence/absence detecting switch 69 to see if it is in an ON state thus indicating the presence of the cassette 1. If so, the flow of operation comes back to the step S21. If not, it indicates the absence of the cassette. Step S26: In that event, the controller 91 causes the display device 92 to make a display indicating the absence of the cassette. Step S24: Then, recording is inhibited. After that, at a step S221, a power-off routine is executed for turning the power supply off. An interrupt routine S000 is arranged to be executed as follows when the switch 74 turns off from an ON state: Step S001: The power supply is first latched. The flow then proceeds to the step S04. Following this, steps S05 to S071 are executed. The flow comes to a step S072. Therefore, the head 5 is always shifted to and stopped at the 51st track when the cover is opened. This permits quick execution of the ensuing initializing process. This embodiment thus accomplishes a preparation for recording in the manner as described above.

Figure 3:
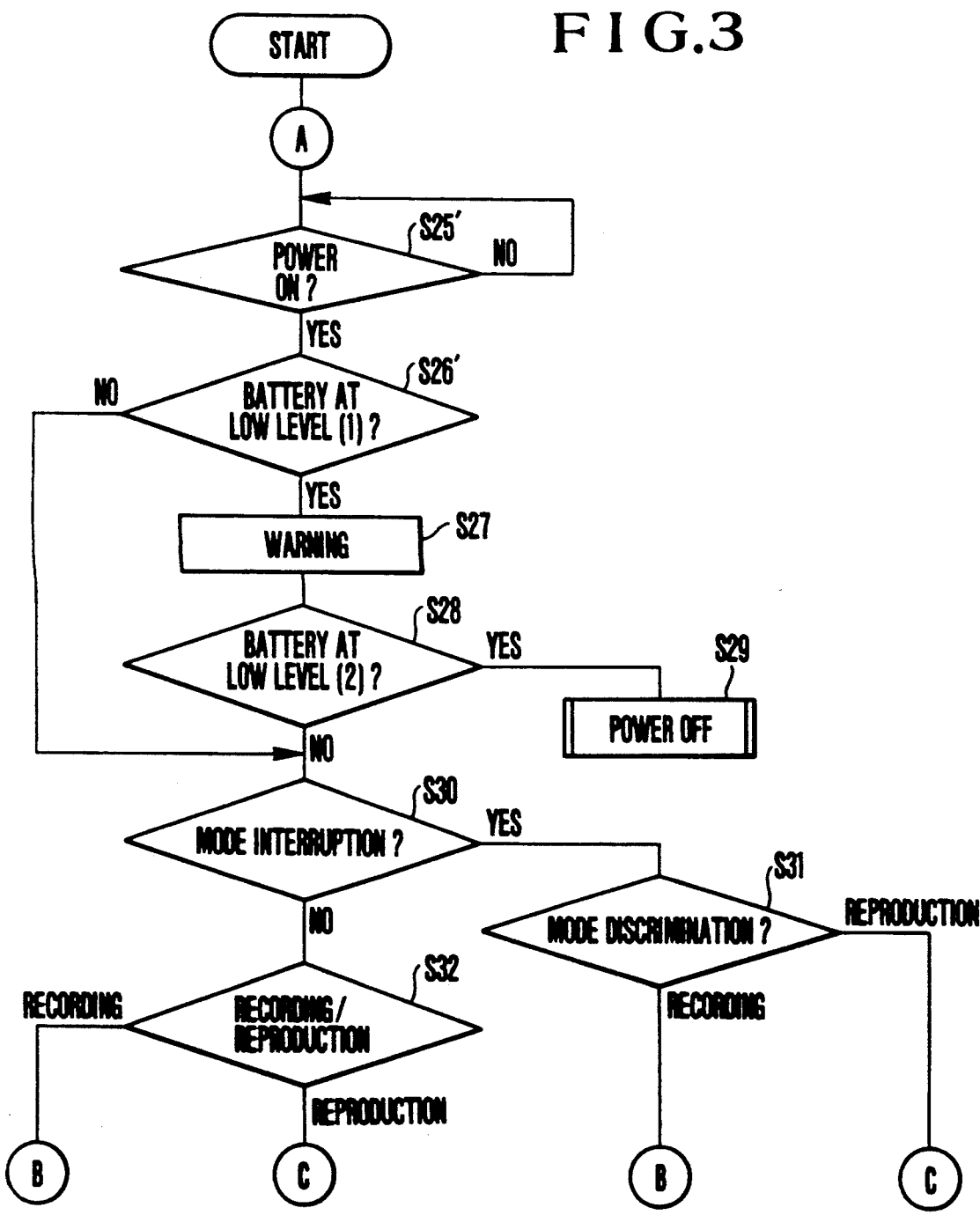

FIGS. 3 to 8 are flow charts showing the operation of a second embodiment of this invention. Referring first to FIG. 3, the second embodiment operates as follows: Step S25': The power supply switch 94 turns on. Step S26': The battery is checked with a first threshold value. Step S27: In the event of a low level of the battery, a warning is given urging replacement of the battery. Step S28: Again battery check is made. This time, the check is made with a threshold value which is lower than the first threshold value to see if the battery retains a minimum electric energy level required for image sensing and recording. Step S29: If not, the power supply switch 94 is turned off. The flow of operation waits until the battery is replaced with a new battery. Step S30: If the energy level of the battery is found sufficient at the step S26 or S28, a check is made first of all for any mode interruption from outside by remote control means. Step S31: If so, the interrupting mode is discriminated. If the mode in question is found to be a recording mode, the flow shifts to a routine (B). If it is found to be a reproducing mode, the flow shifts to a routine (C).

In the event of no mode interruption, the flow comes to a step S32. Step S32: The mode switch 105 of the apparatus body is checked. Then, like in the case of the step S31, the flow shifts to the routine (B) or (C) according as the switch 105 indicates the recording mode or the reproducing mode.

Referring now to FIGS. 4A to 4D, the operation in the recording mode is as follows: At a step S33, a check is made for disc motor rotation starting conditions. In other words, the motor is inhibited from being started if any one of the following conditions is found:

Condition 1: When the cassette presence/absence detecting switch 69 does not show any cassette.

Condition 2: When the outer color lock completion detecting switch 74 is found in a state showing that the outer cover has not been completely locked.

Condition 3: With the cassette take out switch 120 which is to be operated in taking out the cassette examined, if the switch 120 is found in a state showing that the cassette is in process of being taken out.

Condition 4: With the recording preventing claw detecting switch 121 examined in the recording mode, if the switch 121 is found in a state showing that the cassette is in a recording prevented state.

Condition 5: In the recording mode, when the count number of recorded frames as stored at the electrical storing means has already reached a predetermined number.

Condition 6: With the carrier position detector 59 examined in the recording mode, if the detector 59 is found in a state showing that the head is positioned in the innermost part of the disc thus indicating a completely recorded state of the disc loaded on the apparatus.

If none of these conditions apply, the flow of operation proceeds to a step S34. Step S34: The disc motor is driven to rotate to bring the disc into a recordable state. Step S35: A check is made to see if the apparatus has been in the reproducing mode. If so, the flow comes to a step S37. If it is found to have been in the recording mode, the flow proceeds to a step S36. In case that the apparatus has been in the reproducing mode, the track number stored either at the latch circuit 100 or at a memory M (not shown but is disposed within the controller 91) by an initializing process which is similar to the preparatory action for recording shown in FIG. 2 as will be described later might have deviated from the actual head position by frequent shifts of tracks. The checking action at the step S35 solves this problem. If the apparatus is found at the step S35 to have been continuously in the recording mode, checksum judgment is made on the latch circuit 100 or the memory M at the step S36 as will be further described later. If the content of the memory is judged to be correct, the flow shifts to a recording operation to be performed at steps beginning with a step S47. Step S37: An initializing flag IF is set at the memory which is backed up by the backup power supply in preparation against cutting off of power supply during an initializing process. Step S38: The initializing process is performed in a manner as will be described later. Step S39: Upon completion of the initialization, the flag IF is reset.

In the checksum process at the step S36, while the track number is stored at the latch circuit 100 or the memory M backed up by the backup power supply, checksum data such as data of 4 bits (0101) or (1010) or the like is written in along with the track number data when the power supply is cut off. In the event of an abnormity of the action of the memory M or the latch circuit 100, these checksum bits change to 1111 or 0000 in most cases. At the step S36, therefore, an exclusive OR is obtained from such a code as (0101) or (1010) and the checksum bits. If these bits all become "0" as a result of this, the data in question is judged to be normal. If not, it is judged to be abnormal. The data written in the same memory can be thus determined to be correct or wrong. In the event of an abnormity in the track position signal due to a noise mixed in the electric circuit, for example, no signal will be recorded by mistake in a track having an existing record therein.

Step S47: With the checksum found to be OK (all right) at the step S36, a power supply to the on-track detecting circuit 122 is switched on. This circuit 122 is arranged to find whether the head 5 is placed in a predetermined position on the disc 2. Step S48: The head 5 is brought into contact with the disc 2. Step 49: The output of the on-track detecting circuit 122 is checked to see if the head 5 is in an on-track state. If not, the flow comes to the step S37 to perform the recording initializing process over again. In other words, in the case of this embodiment, a check is made to see if the head 5 is correctly positioned at a recording track on the recording medium (disc) or located at a guard band in between two recording tracks when the head is brought into contact with the medium at the step 48. If the head is found not correctly positioned at the recording track, the initialization for recording is carried out over again. If the head is found to be in the "on-track" position, the flow shifts to a step S40. Step S40: Again a check is made for the state of the release switch SW1. If the switch SW1 is found to be in an ON state, the flow proceeds to a step S41. If not, the flow comes back to the routine (A) which begins with the step S25'. Then, the steps of operation mentioned above are repeated.

Step S41: If the apparatus is found not in the recording mode, the flow comes back to the routine (A). If it is found to be in the recording mode, the flow comes to a step S42. Step S42: The second release switch SW2 is checked to see if it is in an ON state. If not, the steps S40, S41 and S42 are repeated until the switch SW2 turns on. The flow then proceeds to a step S43. Step S43: An image sensing and recording operation is performed. After this, the flow comes back to the step S49.

Figure 4A:
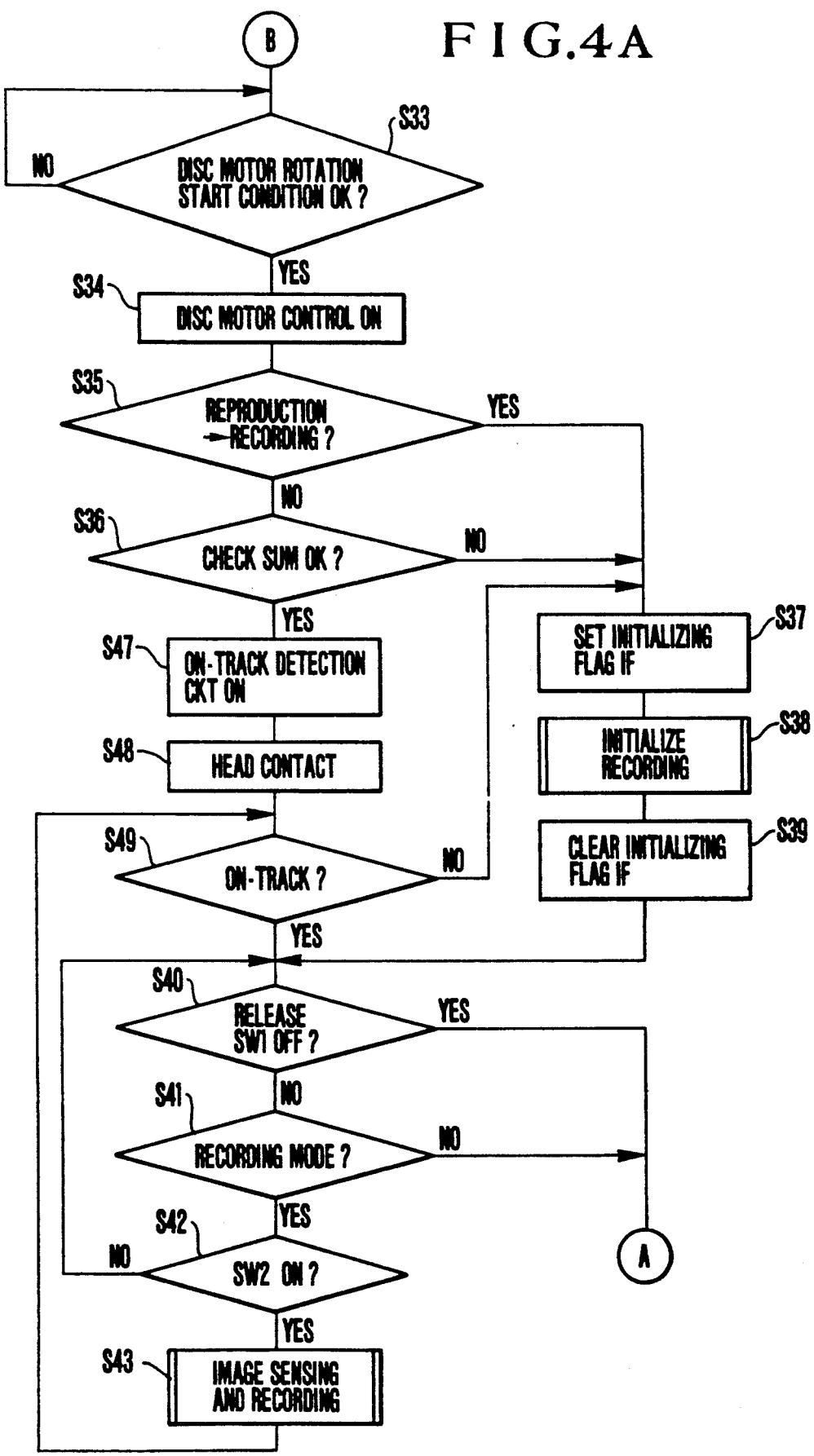
Figure 4B:
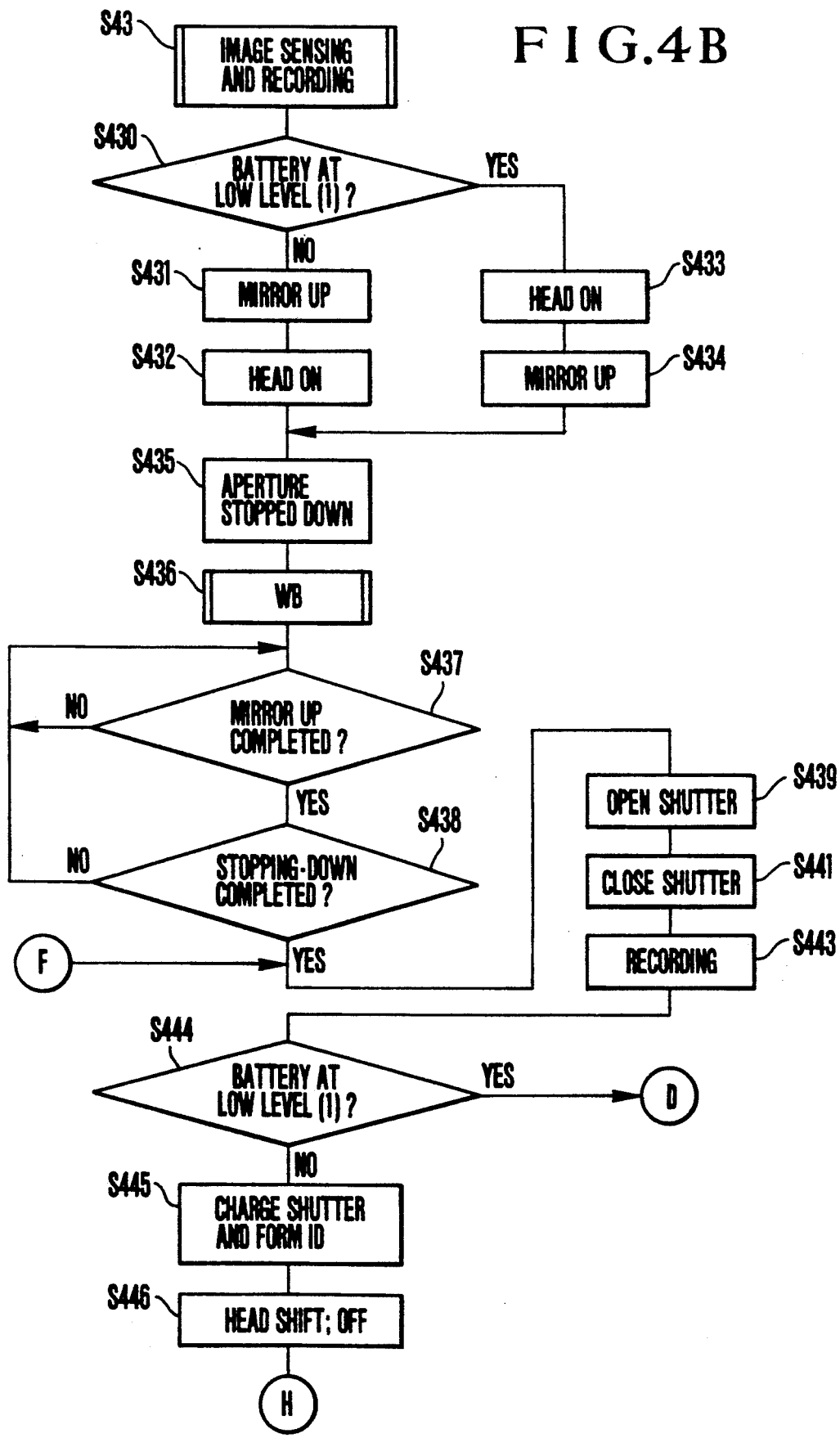

FIGS. 4B, 4C and 4D show the details of the step S43. Step S430: Like in the step S26', the battery is checked to see if it is at a low energy level. If so, the flow first comes to a step S433. Step S433: The head is brought into contact with the disc. Step S434: Then, a mirror is retracted away from an optical path. Meanwhile, if the energy level of the battery is found to be high, the flow proceeds to a step S431. Step S431: The mirror is retracted from the optical path. After that, the flow comes to a step S432. Step S432: The disc is brought into contact with the disc. This step is provided for the purpose of giving priority to the positional relation between the head and the disc in case of sudden deterioration of the battery.

Step S435: The aperture of the camera part is stopped down to a predetermined value. Step S436: White balance is adjusted. Steps S437 and S438: A check is made to see if mirror uplifting (retracting) and aperture stopping-down actions have been completed. If so, the flow comes to a step S439. Step S439: The shutter of the camera part is opened. Step S441: The shutter is closed to bring an exposure to an end.

Step S443: Recording is performed. Step S444: Again the battery is checked to see if the energy level of the battery is low. If so, the flow comes to a step S454 of FIG. 4D. If not, the flow proceeds to a step S445. Step S445: The shutter of the camera part is charged. In the meantime, an ID signal is encoded. Then, an error detection code, etc. are added to the ID signal. The ID signal is provided for the purpose of recording information about the recording track number, etc. in a state of being superimposed upon a video signal. This step somewhat quickens the speed of the whole program. The flow then proceeds to a step S446. Step S446: The head is shifted forward by one track pitch. The flow proceeds to a step S447. Step S447: The track number is incremented by one. Meanwhile, if the level of the battery is low, it might come to suddenly drop before the end of a process. Therefore, in that event, the flow comes to the step S454. Step S454: The position of the head is first shifted. Step S455: Then, the track number is renewed. Step S456: The shutter is charged and the ID signal is formed. The flow then comes to a step S448. Step S448: A check is made for the ON state of the switch SW2. If is it in the ON state, the image sensing recording operation is assumed to continue. The flow then comes to a step S449. Step S449: A check is made to see if the operation is in the mode of high speed continuous shooting. Further, a check is made to see if a flash device which is not shown is in a charge-up state. If so, the high speed continuous shooting is impossible. In that event, therefore, the flow comes to a step 451. If the flash device is found not in the charge-up state or if no flash device is used, the flow comes back to the step S439 to repeat the photo taking sequence of processes.

Step S451: The mirror is moved back to the inside of the optical path. The aperture is opened. Step S452: A check is made to see if the apparatus is in a low speed continuous shooting mode. If so, the flow comes back to the step S430. If not, the flow comes to a step S453. Step S453: A power-off routine is executed. The program of operation then comes to an end.

Figure 5:
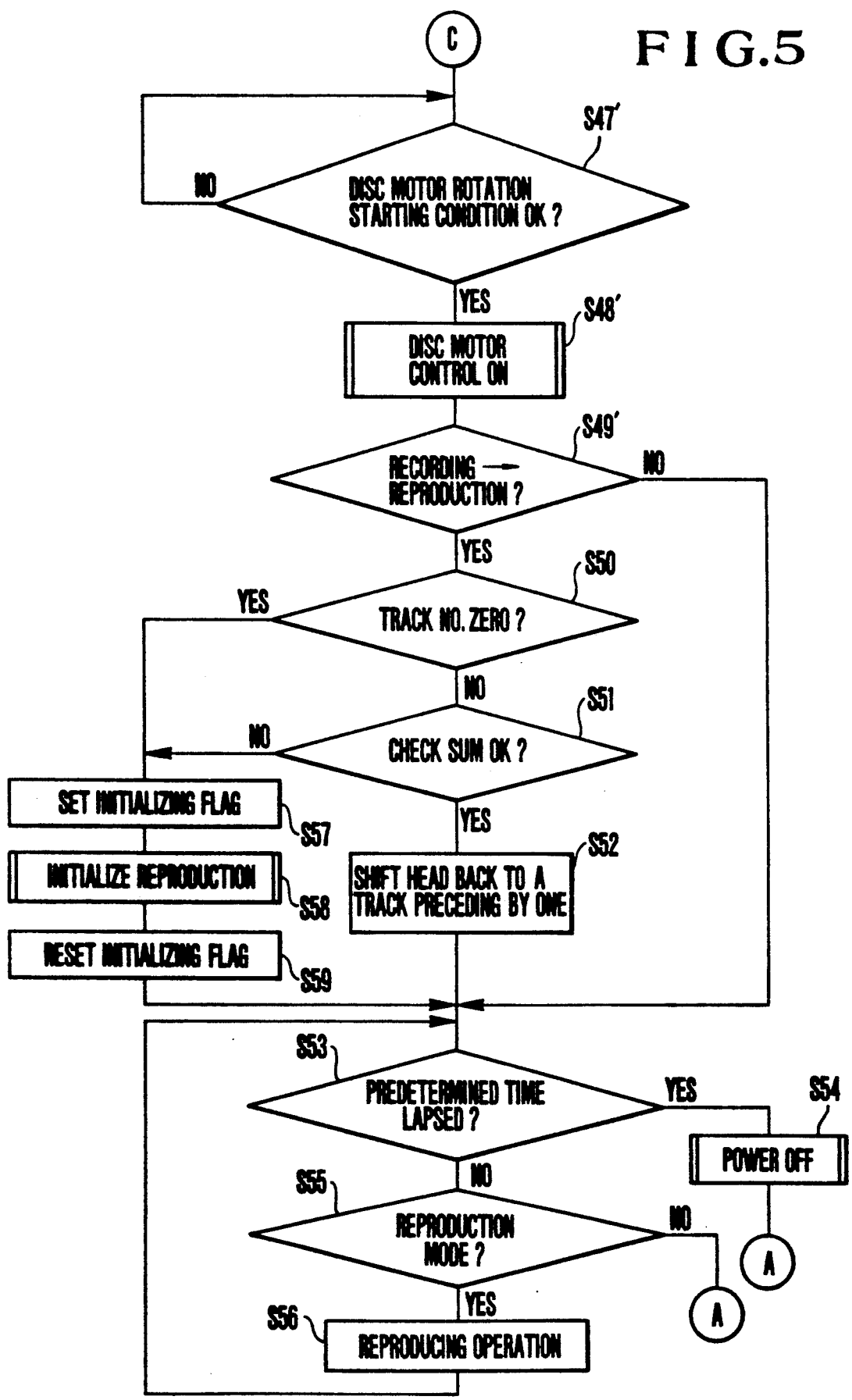

Referring to FIG. 5, the operation in the reproducing mode is as follows: Step S47': Like in the recording mode, the disc motor rotation starting conditions are examined. Step S48': The disc motor is driven to rotate. Step S49': A check is made to see if the apparatus have been in the recording mode. If so, the flow comes to a step S50 and ensuing steps. If not, the flow shifts to a step S53. Step S50: A check is made to see if the present track number is "0". If so, reproduction is considered impossible and the flow comes to steps S57 to S59 to execute an initializing process in a manner similar to the steps S37 to S39 of FIG. 4A. In case that the present track number is found not "0" at the step S50, the flow proceeds to a step S51 to make a check for the checksum in a manner similar to the step S36 of FIG. 4A. Step S52: If the result of this is OK, the head is shifted to a track immediately preceding the present track. In other words, the head is shifted to a track recorded immediately before the present head position. This arrangement permits immediate recording in the recording mode and immediate confirmation of information last recorded in the reproducing mode. Further, in the case of the reproducing mode, this step saves the operator from having a disagreeable feeling which would be caused by an unrecorded track otherwise appearing in the beginning of reproduction.

Step S53: A check is made to see if a given length of time has lapsed from the time of the step S25' of FIG. 3. If so, the reproducing mode is assumed not to be continued. The flow then comes to a step S54. Step S54: The power supply is switched off and the flow comes back to the routine (A). If the length of time is found not to have lapsed at the step S53, the reproducing mode is assumed to be continued and the flow comes to a step S55. Step S55: A check is made to see if the apparatus is in the reproducing mode. If not, the flow comes to the routine (A). If so, the flow comes to a step S56. Step S56: Reproduction is performed. During the process of reproduction, the discriminating actions of the steps S53 and S55 are incessantly performed.

In this instance, a timer is used and the power supply is arranged to be cut off after the lapse of a given period of time. In case that the reproduction circuit is arranged to be connected to the outside of the apparatus as an adapter PA for reproduction, the step S53 may be replaced with another step S53' at which the power supply to the reproduction adapter PA begins. In that instance, the power supply to the reproduction adapter is kept off until execution of the step S53'. This arrangement not only saves the energy of the power source from being wasted but also prevents a connector used for the terminal 110 of FIG. 1 from corroding.

Referring to FIG. 6, the power off routine shown in FIGS. 3 to 5 are arranged as described below:

Step S60: The drive output of the disc motor 88 is turned off. Step S61: The head 5 is retracted away from the disc 2. Step S610: A checksum is added to the track number stored at the latch circuit 100. Step S62: The main power supply is switched off to bring the operation to an end. The method for retracting the head at the step S61 is as described below:

Referring to FIG. 7, this embodiment is arranged to drive the head by 12 steps for each track pitch TP. The head is arranged to be shifted relative to the disc through a cam which is arranged to cooperate with the stepping motor in such a manner that: The head stays away from the surface of the disc during the periods approximately from first to fourth steps and from ninth to twelfth steps. The head comes into contact with the surface of the disc between the fifth and eighth steps.

The present step position of the stepping motor is recorded at a memory within the control circuit and is duodecimally renewed every time the step motor 49 is driven. In retracting the head 5, therefore, the step motor 49 is driven to shift the head 5 to a position at a track located close to the first step.

Figure 9:
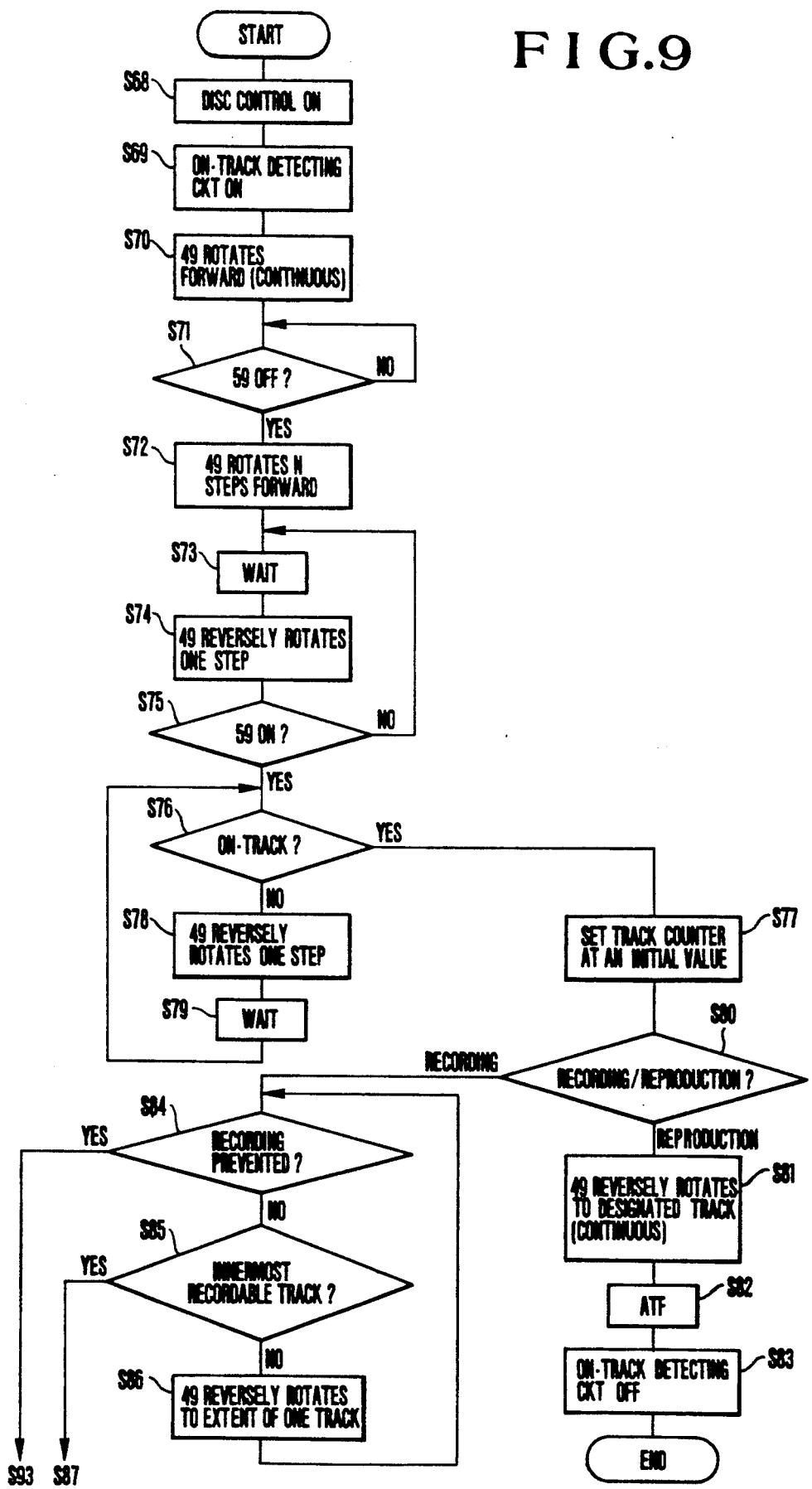
Figure 10:
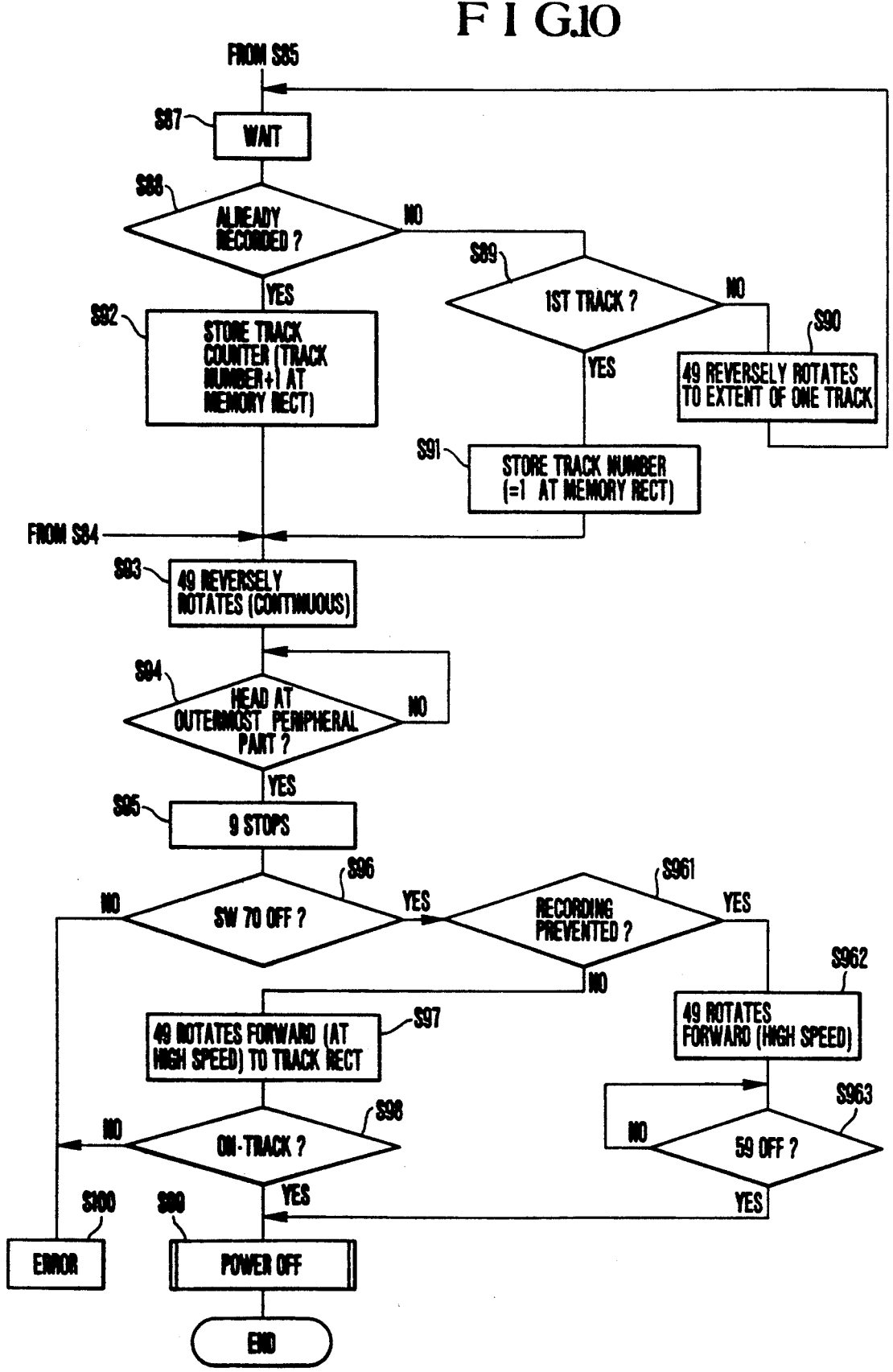

Referring to FIGS. 9 and 10, the details of the initializing routine shown in FIGS. 4A and 5 are as shown in steps S68 to S77. Step S68: Like in the step S34 of FIG. 4A, control over the disc motor 88 begins. Step S69: A power supply to the on-track detecting circuit 122 is switched on. Step S70: The stepping motor 49 is caused to continuously rotate forward for driving the head. Step S71: The head 5 is driven inward until the carrier position detector 59 turns off with the head shifted to a position between the 51st and 52nd tracks. Step S72: The stepping motor 49 is caused to further rotate forward an N number of steps (N: an integer between 0 and 12) to ensure that the head is shifted to the innermost position on the disc.

Step S73: After the step S72, in order to drive the stepping motor 49 more stably than usual driving, the flow of operation has a wait time, which is about 2 to 3 times as much as the energizing time required per step of the stepping motor. Step S74: After the lapse of the wait time, the stepping motor 49 is caused to reversely rotate to shift thereby the head toward the outer periphery of the disc. The steps S73 and S74 are repeated until the carrier position detector 59 turns on with its position changed over between the 51st and 52nd tracks. Step S75: A check is made to see if the detector 59 is in an ON state. If so, the flow comes to a step S76. Step S76: The level of the on-track signal 124 is checked to see if the head is positioned approximately in the middle part of the track, i.e. whether the head is in an on-track state. If not, the flow has a wait time at steps S78 and S79 in the same manner as in the steps S73 and S74 to ensure that the head is accurately shifted toward the periphery of the disc step by step. The flow then comes back to the step S76. When the head is found to be in the on-track state at the step S76, the flow comes to a step S77. Step S77: The track counter is initialized with the head position which is obtained at that time considered to be the innermost on-track position.

Step S80: A check is made for discrimination between the recording mode and the reproduction mode. The flow then branches out to the reproduction initialization to be performed at steps S81 to S83 or to the recording initialization to be performed at a step S84 and ensuing steps according to the result of the discrimination. The initialization for reproduction is as follows: Step S81: In the case of the reproduction mode, the head is first shifted to an arbitrarily designated track position. The designation of a track to be reproduced is made from outside by means of a ten-key or up-down key arrangement, the details of which is omitted herein. In the event of no designation of any particular track for reproduction, the head is shifted to the first track which is located in the outermost part of the disc.

Step S82: Tracking control (automatic tracking finding) is performed by using the output of the record presence/absence detecting circuit 85 in such a way as to have a recorded signal reproduced from the designated track at the optimum level. Step S83: The on-track detecting circuit 122 is turned off to bring the initializing action to an end. At that time, the power supply of the whole apparatus is kept unchanged.

Next, initialization for recording is as follows: Step S84: In the event of the recording mode at the step S80, the switch 121 is checked for a recording preventing state of the cassette. If the cassette is thus found in a state of having no recording preventing claw, the flow shifts to a step S93 of FIG. 10. If not, the flow proceeds to a step S85. Step S85: A check is made to see if the present position of the head is at the innermost track among all the recordable tracks (the 50th track in the case of this embodiment). Assuming that the total number of tracks is 51, the 51st track is often used for recording a signal for some other purpose different from other tracks, such as disc control information, etc. In that event, the innermost recordable track is the 50th track. Step S86: The head is shifted outward by one track pitch distance to the innermost recordable track (the 50th track in this instance). The flow then proceeds to a step S87.

Steps S87 to S92 are provided for finding out a recording track position and are arranged as follows:

Step S87: A wait time is provided until the head position is stabilized. After the lapse of the wait time, the flow comes to a step S88. Step S88: The level of signal reproduction from the track is detected and the track is determined to be recorded or unrecorded by the record presence/absence detecting circuit 85. If the track is thus found to be unrecorded, the flow comes to a step S89. Step S89: A check is made to see if the present position of the head is at the first track. If not, the stepping motor 49 is reversely rotated by one track pitch in the direction of the periphery of the disc. The flow then comes back to the step S87.

If the head position is found to be at the first track at the step S89, the disc presently loaded on the apparatus is determined to be unrecorded. Then, data is stored indicating that the track in which recording is to be made from now is the first track. In other words, for example, "1" is stored at the memory M labeled "RECT" within the controller.

In case that the present track is found to be a recorded track at the step S88, the track number of a track located next to the present track on the inner side thereof is stored as the track to be recorded from now. In other words, the count of the track counter obtained at that time is incremented by one and is stored at the memory "RECT". Step S93: With the position of the track to be next recorded thus determined, the cassette loading/unloading detecting switch 70 is turned off for storing information about the end of a vacant track detecting action. For that purpose, the stepping motor 49 is driven toward the periphery of the disc. Step S94: Then, when the content of the track counter becomes less than "1" or when the carrier position detector 58 turns off, the flow comes to a step S95. Step S95: The rotation of the stepping motor 49 is brought to a stop. Step S96: Then, a check is made to see if the cassette loading/unloading detection switch 70 is in an OFF state. If so, the flow comes to a step S961 to make a check to see if the recording preventing claw of the cassette is broken. If so, the flow comes to a step S962 to cause the motor 49 to make forward rotation. When the position detector (or switch) 59 turns off at a step S963, the flow comes to a step S99 at which the power-off routine is executed. Meanwhile, if the cassette is not in the recording preventing state, the flow comes to a step S97. Step S97: The head is first shifted to a position corresponding to data stored at the memory "RECT" in the steps S91 and S92. In this instance, the system controller 91 causes the stepping motor 49 to be driven at a speed higher than the stepping motor driving speed employed for the steps S70, S72, S74, S78, S81, S86, S90 and S93. More specifically, driving pulses of a higher frequency are applied to the motor in this instance. Further, the stepping motor is driven at the higher speed also at the above stated step S962.

Since the embodiment is arranged as described above, the stepping motor 49 must be driven at a lower speed for detecting the presence or absence of a recorded signal existing in each of the tracks in search of a vacant track. Whereas, in the case of the step S97, the head shifting action is quickly completed without keeping the operator waiting for long.

Step S98: The on-track signal 124 is checked for confirmation of that the head is in the optimum track position on the disc. If the on-track state of the head is thus confirmed, the flow proceeds to a step S99. Step S99: The power-off routine for turning off the power supply for the whole apparatus is executed. The initializing action for recording then comes to an end. The arrangement to turn off the power supply upon completion of initialization for recording saves electric energy. In the reproducing mode, on the other hand, the power supply is not cut off after completion of initialization as the record is usually reproduced immediately after completion of initialization for reproduction.

In case that the switch 70 is found not in the OFF state at the step S96 or the head is found not in the on-track state at the step S98, the flow comes to a step S100 at which an error processing action is carried out. The error processing action may be arranged to make a warning display or to carry out the initializing action again. Further, although it is not shown in the drawings, an appropriate error processing action may be performed in the event of occurrence of any abnormity during the execution of the steps shown in FIGS. 2 to 10.

Figure 8:
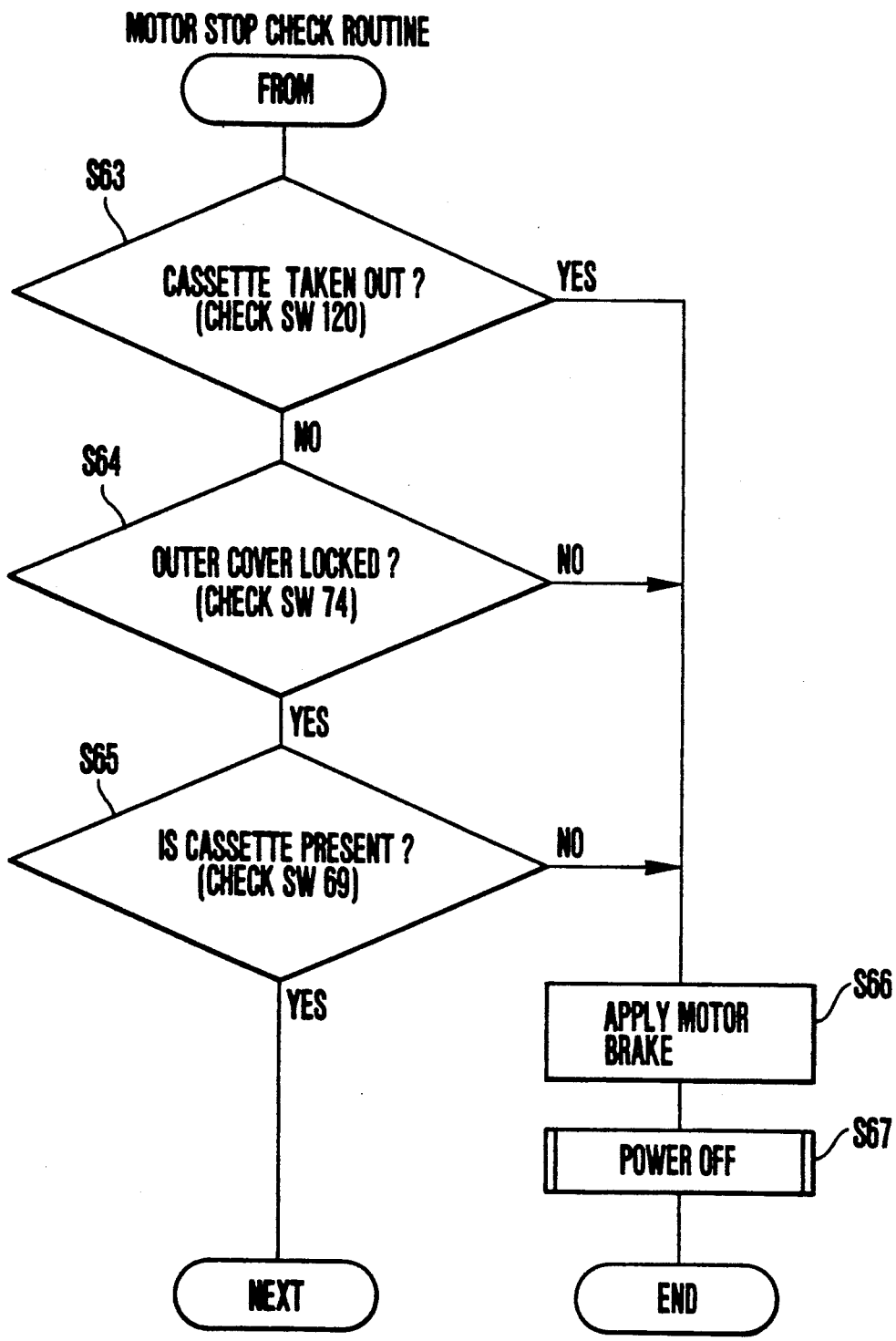

In this embodiment, the switch 70 is arranged to turn off when the head 5 is shifted to a part located on the outer side of the No. 0 track on the disc. Further, in the case of an electronic camera, for example, the disc motor might be mechanically damaged in general when the disc and the disc motor is released from their checking state while the motor is rotating. To avoid this, therefore, this embodiment is arranged to make a check and then the motor is brought to a stop in the case of parting the disc from the motor in a manner as shown in FIG. 8. This operation is as follows: Step S63: A check is made to see if the operator is operating the cassette take-out switch 120. If so, the disc and the motor are expected to be soon released from their chucking engagement. Step S66: Therefore, the brake is applied to the motor to bring the motor to a stop. Following this, the power off routine of FIG. 6 is executed as stated in the foregoing. Further, if the cassette take-out switch 120 is found not under operation at the step S63, the flow proceeds to a step S64. Step S64: A check is made for completion of an outer cover locking process. This step is provided for the purpose of preventing an erroneous check due to inappropriate checking timing. In case that the outer cover locking has not been completed at the step S64, the flow comes to the step S66. If it is found to have been completed, the flow comes to a step S65. Step S65: This step is provided for preventing any error of the checks made at the preceding steps S63 and S64. If the cassette is found to be absent, the flow comes to the step S66. If the cassette is present, the flow comes to execute an ensuing process.

These steps S63 to S65 may be executed either while the motor is rotating or may be constantly executed at intervals of a given period of time. It is also possible to execute these steps in an interrupting manner by means of a switch 120. Further, the above stated process may be changed in cases where the system arrangement permits highly reliable prior detection of parting of the disc and the motor from each other solely by the check made at the step S63. The process may be also changed to detect the position of the cassette take-out switch and to have the cassette ejected after the motor is stopped instead of electrically ejecting the cassette. Further, the electrical brake application to the motor may be changed to mechanical brake application. The braking effect may be enhanced by bringing the head into contact with the motor. In this case, the head is retracted after the motor comes to a stop.

In the system described, the head is arranged to be shiftable relative to the disc. However, the system may be arranged to shift a pad which is arranged to bring the head into contact with the disc. In that case, the sequence of processes described above may be changed to have the pad, instead of the head, retracted from and brought into contact with the disc.

While this invention is applied to a video signal recording apparatus in the case of the embodiment described in the foregoing, the invention is applicable also to an apparatus for recording an audio signal or information such as data. Furthermore, the recording method to which this information is applicable is not limited to magnetic recording. The record bearing medium usable according to this invention is not limited to the disc shaped medium but may be a medium of a drum-like shape or a tape-like shape, such as the one used by an 8-track audio recorder.

Figure 11:
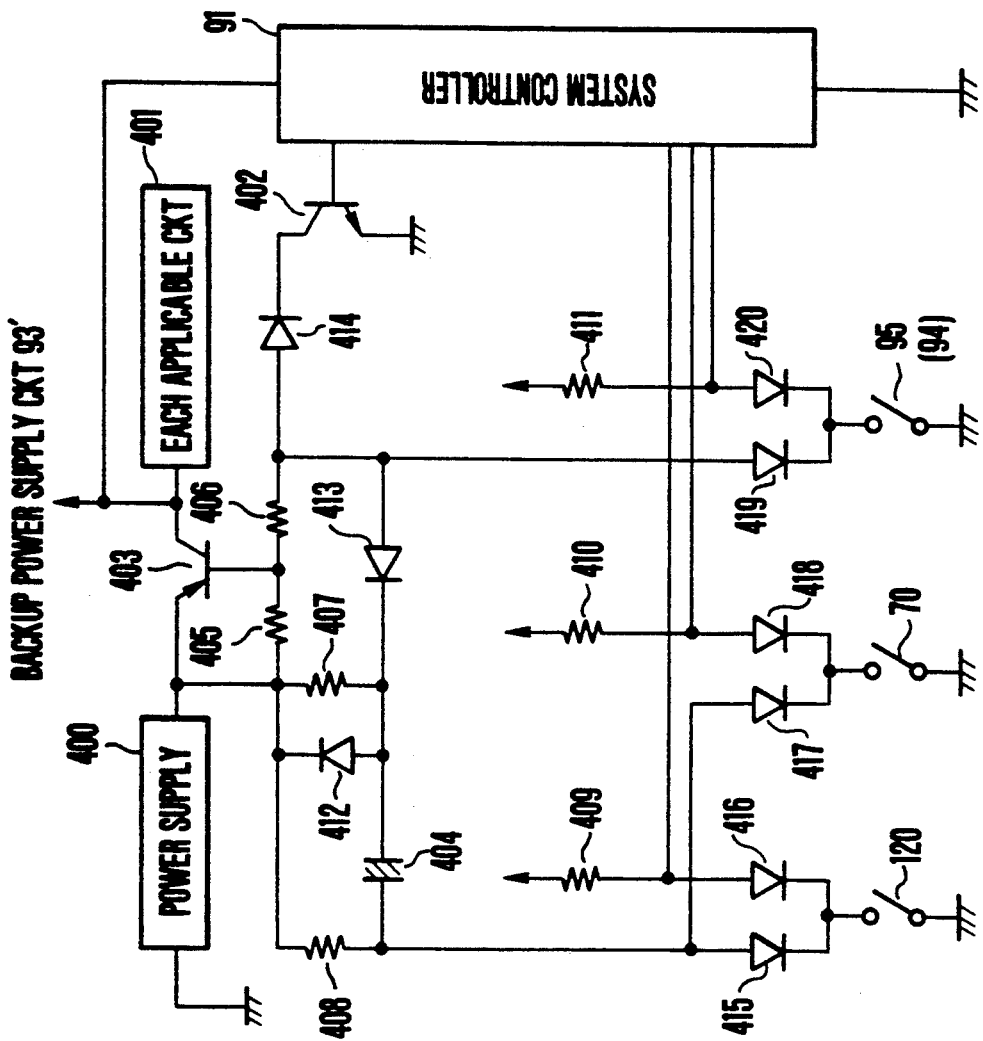
FIG. 11 is a circuit diagram showing the details of the power supply circuit of the embodiment of this invention.

FIG. 11 shows by way of example the details of the power supply circuit 93 of FIG. 1. The circuit diagram of FIG. 11 includes a battery or an AC power supply 400; each applicable circuit 401; switching transistors 402 and 403; a capacitor 404; resistors 405 to 411; and diodes 412 to 420. The resistor 406, the diode 413 and the capacitor 404 jointly form a charging circuit for pulling the base current of the transistor 403 into the capacitor 404. The diode 412 and the resistor 408 form a discharge circuit for the capacitor 404. Further, the resistor 407 is also included in the discharge circuit for the capacitor 404. When the cassette take-out switch 120 or the cassette loading/unloading detecting switch 70 is turned on, a current from the power supply 400 flows through the resistor 406, the diode 413, the capacitor 404; the diode 415 (417) and the switch 120 (70). Then, the switching transistor 403 turns on and remains in the ON state until the capacitor 404 is charged with the current. With the transistor remaining in the ON state during the period before the capacitor 404 is charged, the system controller 91 is supplied with electric energy. This actuates and enables the controller 91 to detect the switching states of the switches 120, 70 and 95. When the ON state of the cassette take-out detecting switch 120 is detected, the system controller instructs the stepping motor driving circuit 87 to have the head 5 retracted to a retracting position thereof shown in FIG. 7. In case that the head is completely retracted before completion of the charging process on the capacitor 404, the power supply to the applicable circuits is cut off with the transistor 403 automatically turned off following completion of the capacitor charging process. In case where the head is not retracted within the period of time required for charging the capacitor 404, the system controller 91 keeps the transistor 403 in its ON state by turning the transistor 402 on until completion of the head retracting process. In that case, the power supply is thus continuously applied particularly to the stepping motor driving circuit 87.

Further, when a lock lever 221 which will be described later begins to be operated, at the beginning of the lever operating process, the cassette take-out switch 120 immediately turns on. This gives some time lag before an outer cover 235 is opened by the lever operation and thus allows the head 5 to be shifted to the head retracting position before the outer cover 235 is actually opened. Therefore, the head 5 and the magnetic disc 2 can be prevented from being damaged.

In this specific embodiment, the cassette loading/unloading detecting switch 70 is connected in parallel with the switch 70. Therefore, when the switch 70 turns on with the cassette replaced with another cassette, the switching transistor 403 becomes conductive in the same manner as when the switch 120 is turned on. This enables the power supply to be applied to the system controller 91 as well as to each applicable circuit. Then, the above stated initializing action is carried out. The system controller 91 keeps the transistor 402 in its ON state to maintain the power supply to each applicable circuit until completion of initialization.

Upon completion of the initializing action, the system controller 91 causes the transistor 402 to turn off, so that the electric energy can be saved from being wasted. Further, with the cassette loading/unloading detecting switch 70 connected in parallel with the switch 120, the other transistor 403 is arranged to be turned on via the capacitor 404. Therefore, in case that the switch 70 is unable to return from an ON state to an OFF state with no initializing action performed due to some reason, wasteful electric energy consumption can be prevented from occurring due to a persistent conductive state of the transistor 403. This is a great advantage in terms of electric energy saving.

Meanwhile, the switch 95 which is arranged to be turned on by the first step stroke of the release button 96 is connected directly to the base of the transistor 403 without having any capacitor interposed in between them. Therefore, the transistor 403 continues to be in its ON state as long as the switch 95 is in an ON state. This allows the power supply to be applied to each applicable circuit without fail under that condition.

The advantages of this embodiment:

a. In the reproducing mode, the power supply remains on after completion of initialization. However, in the recording mode, in which the time for a next image sensing recording operation is uncertain, the power supply is cut off upon completion of initialization. This ensures a great electric energy saving effect in the recording mode on one hand and a good operability in the reproducing mode on the other as the reproduced picture can be monitored immediately after the cassette is loaded.

b. In the reproducing mode, frequent shifts of the head position tend to result in some deviation of the electrical head control signal from an actual head position. Even in that event, the invented arrangement eliminates the possibility of signal recording in a wrong track.

c. In case that the electrical control signal is disturbed by some external noise due to a head shifting action, the invented arrangement eliminates the possibility of recording in a wrong track.

d. In detecting replacement of the cassette, the power supply is kept on for a given period of time after the cassette is replaced with a new cassette in accordance with the output state of the detecting means. This enables the newly loaded cassette to be initialized before recording or reproduction. After that, recording or reproduction can be performed any time as desired.

e. In the event of use of an external discrete device such as the reproduction adapter, for example, the power supply to the external device is inhibited until completion of the initial positioning action on the head relative to the record bearing medium as mentioned at the step S53 of FIG. 5 or the step S53': This arrangement prevents the energy of the power source from being wasted. Further, the arrangement eliminates the possibility of abnormal consumption of the electric energy for the initial head positioning action.

In the embodiment and its modifications described in the foregoing, the recording tracks on the disc are numbered in sequence from the peripheral side of the disc toward the center of the disc. However, the direction of this track numbering sequence may be reversed. In that event, the flow of operation shown in the drawings should be somewhat changed accordingly.

In the case of the embodiment described, this invention is applied to a camera-combined type still video recording apparatus. However, the camera part 81 of course may be replaced with some discrete camera device. Further, the power source of the recording apparatus is not limited to the battery. The apparatus may be arranged to permit use of a commercial power source.

Figure 13:
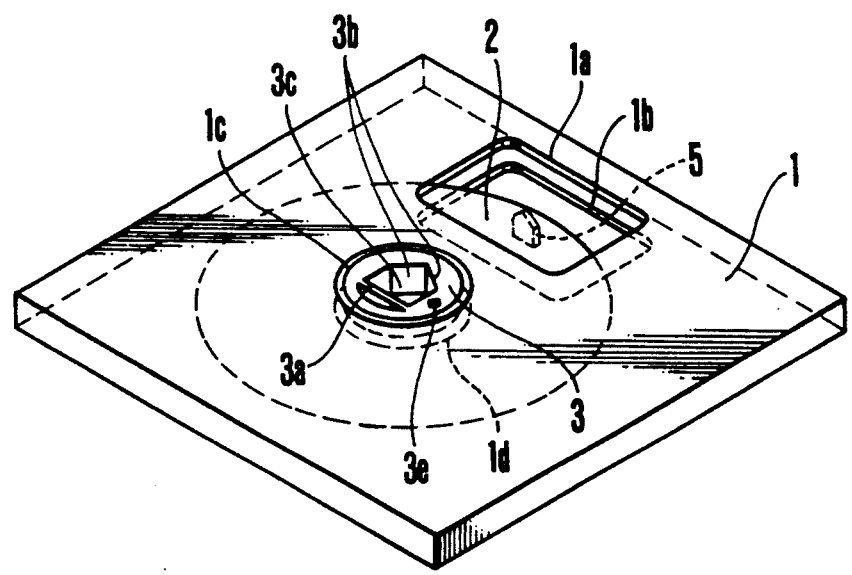
FIGS. 12 and 13 are oblique views showing the driving part of the recording and/or reproducing apparatus arranged as an embodiment of this invention and a record bearing medium with its carrier.
Figure 12:
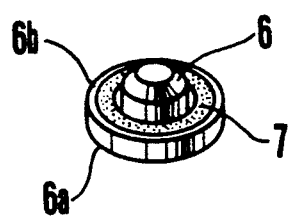

The record bearing medium which is usable by the embodiment and the medium loading device of the embodiment are arranged as described below:

The record bearing medium usable by an embodiment of this invention is arranged as shown in FIGS. 12 and 13. FIG. 12 is an oblique view of a rotatory driving spindle 6. FIG. 13 is an oblique view of a cassette 1 carrying a magnetic disc 2 which is employed as the record bearing medium to be rotated by the above stated spindle 6. The magnetic disc 2 is a rotatable flexible body and is disposed within the cassette. A center core 3 which is made of a synthetic resin is located in the middle part of the magnetic disc 2. To the lower side of the center core 3 is secured a magnetic plate 3d (see FIGS. 15B and 15C). A magnetized pin 3e which is arranged to indicate the rotation phase of the disc is provided on the magnetic plate 3d and is arranged to pierce through the center core 3. Apertures 1a and 1b are provided on the upper and lower sides of the cassette 1. These apertures are arranged to permit ingression of stabilizing plates 37 and 15 (see FIG. 14) which are provided for stabilization of the rotation of the magnetic disc 2. The lower side aperture 1b also permits the recording magnetic head 5 to have access to the recording face of the magnetic disc 2 therethrough.

The center core 3 is arranged to be mounted on the magnetic disc rotating driving spindle 6 which is disposed on the loading side of the apparatus. The center core 3 is provided with an engaging hole 3c, which is formed by two slanting face parts 3b and a spring part 3a. The spring part 3a is arranged to push the slanting face parts 3b against the spindle 6. A permanent magnet 7 is arranged on a flange part 6a of the spindle 6 to confront the magnetic plate 3d which is disposed on the lower side of the center core 3. The so-called magnetic chucking takes place with the magnetic plate 3d pulled by the permanent magnet 7 on the spindle 6 when the center core 3 is mounted on the spindle 6. On that occasion, the height of the magnetic disc 2 relative to the head 5 is defined as the lower side of the center core 3 comes to abut on the flange face 6b of the flange part 6a of the spindle 6. The cassette 1 is provided further with upper and lower apertures 1c and 1d which are formed in a position corresponding to the center core 3.

The embodiment of this invention using a magnetic disc arranged in the cassette in the manner as described above is provided with a mechanical device which is arranged for the use of the disc as described below:

Referring to FIG. 14, the illustration includes a chassis 11 of the recording apparatus. The spindle 6 and the head 5 are rotatable and shiftable on the chassis 11. The chassis 11 is provided with a hinge shaft 12 and a side plate 16. A shaft 17 is erected on the side plate 16. A clamping lever 18 is rotatably mounted on the shaft 17 and is urged to turn round clockwise by a spring 19. A pair of pins 20 is arranged on the side plate 16 to guide two slidable lock levers 21 and 23. The levers 21 and 23 are urged to move leftward by springs 22 and 24, which are attached to pins 41 and 42. The pins 41 and 42 are also erected on the side plate 16.

A cassette holder 31 is arranged to receive the cassette. The holder 31 is turnable on the hinge shaft 12 relative to the above stated chassis 11 of the apparatus body. The holder 31 is provided with an opening part 31f which opens on one end of the holder 31 for receiving the cassette 1. The holder 31 is provided further with apertures 31a and 31b for permitting stabilizer plates 37 and 15 to enter the holder 31; and also with apertures 31c and 31d which are arranged to permit the spindle 6 and a protrudent part 38a of a center core pushing leaf spring 38 to enter the holder.

Another aperture 31g of the holder 31 is arranged on the lower side of the holder 31 to permit the entrance of a cassette sensing piece 66a of a cassette loading/unloading detecting lever 66 (see FIG. 17) into the holder. An outer cover 35 is attached to the body chassis 11 in such a way as to be turnable on the hinge shaft 12 through the hinge part 35a thereof. Lock pins 36a and 36b are erected on the fore end side face 35c of the outer cover 35. The outer cover 35 is also provided with a hook member 40 which is arranged to engage the holder 31. An upper stabilizing plate 37 which is attached to the ceiling part of the outer cover 35 is arranged in combination with a lower stabilizing plate 15 which is disposed on the side of the body chassis 11. These stabilizing plates 37 and 15 are arranged to have the magnetic disc 2 interposed in between them and to prevent the disc 2 from vibrating and deforming when it rotates. In that instance, a suitable layer of air is formed between the disc 2 and each of the stabilizing plates 37 and 15. The head 5 is arranged to protrude through an aperture 15a provided in the middle part of the lower stabilizing plate 15. A leaf spring 38 in the form of a T-shaped plate has its tail end 38b secured to the ceiling part of the outer cover 35 by means of a screw or the like. A portion 38a of the fore end of the leaf spring 38 is arranged to protrude downward as shown in FIG. 14. Position defining members 39 which are attached to the ceiling part of the outer cover 35 engage the edge parts 38c on both sides of the leaf spring 38 are arranged to restrict the position of the leaf spring against its resilience. The arrangement imparts an initial force to a protruding part 38a of the leaf spring 38. Under that condition, the protrudent part 38a comes to the upper part of the spindle 6.

Figure 16A:
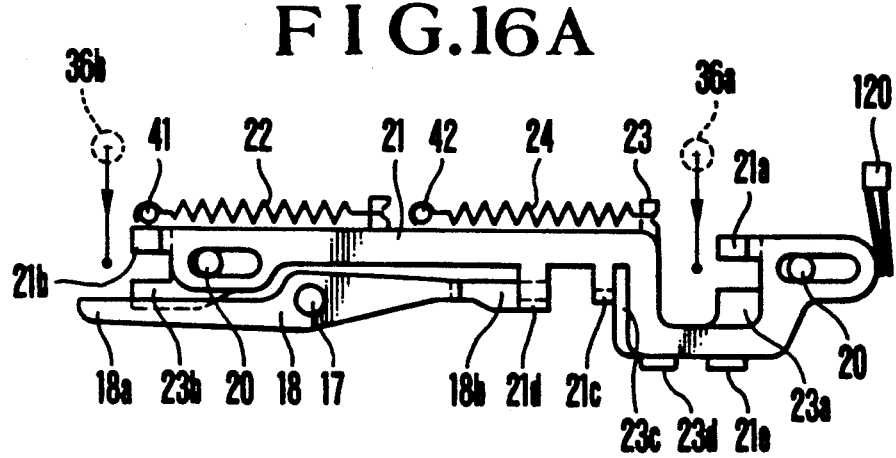
FIGS. 16A, 16B and 16C are plan views showing in detail the varied states of a cover lock part of the device of FIG. 14.
Figure 16B:
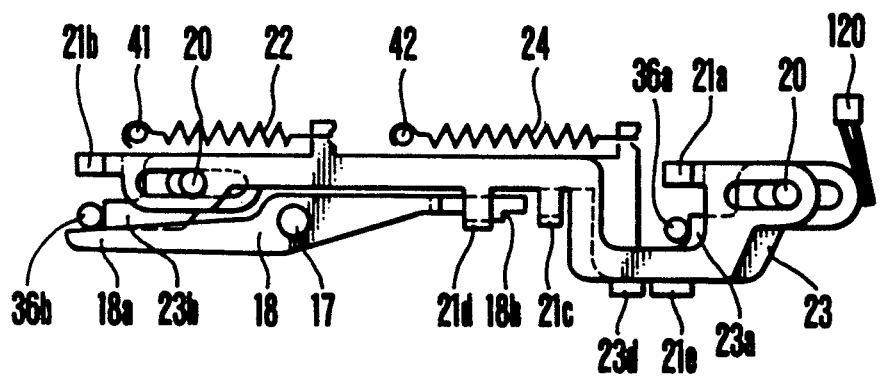
Figure 16C:
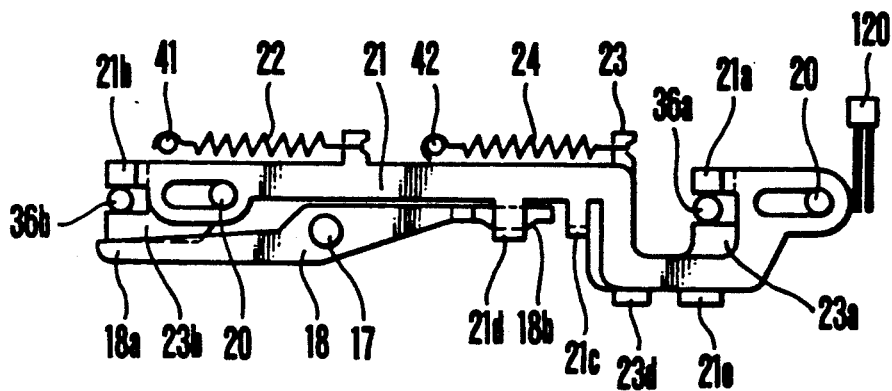

A spring 13 which is provided on the above stated hinge shaft 12 has its arm parts abut on the holder 31 and the outer cover 35 respectively and is arranged to exert a turning force on the cover 35 in the direction of opening it relative to the holder 31. A spring 14 has one arm part thereof abut on the body chassis 11 and the other arm part abut on the outer cover 35 and is thus arranged to exert a counterclockwise turning force on the outer cover 35. A normally open type outer cover lock completion detecting switch 74 which is mentioned in the foregoing is provided on the body chassis 11 and is arranged to have its contact piece 74a pushed by the switch control arm 23d of the lock lever 23. Under the condition as shown in FIGS. 15c and 16c, its contact pieces 74a and 74b come into contact with each other.

Figure 17:
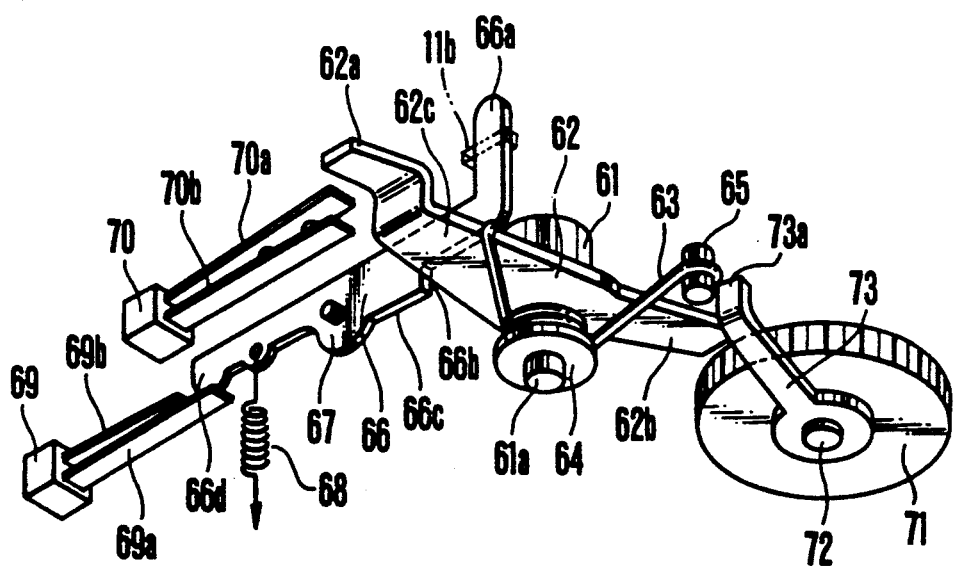
FIG. 17 is an oblique view taken from below showing an embodiment of this invention and particularly a device thereof for detecting and memorizing a replacing action performed on cassettes (by dismounting and mounting them).

Referring to FIG. 17, memory means for mechanically storing information on a replacing action performed on the cassette 1 (by loading and unloading) is arranged as follows: A shaft member 61 which is arranged to pivotally carry a lever is secured to the reverse side of a top board of the chassis 11. A switch operation lever 62 is pivotally and swingably carried by the shaft part 61a of the pivotally carrying shaft member 61. The fore end of the lever 62 is formed into a switch operation part 62a which is bent in such a way as to be located above the contact piece 70a of the switch 70 when it is in a neutral state. A spring 63 is arranged to urge the lever 62 to turn counterclockwise as viewed on the drawing and to keep it in a neutral state. The spring 63 is wound round the shaft part 61a of the pivotally carrying shaft member 61. Two ends of the spring 63 are hooked on the lever 62 and a fixed pin 65 respectively. The pin 65 is arranged to restrict the counterclockwise turn of the lever 62 by engaging the tail end 62b of the lever 62 when the switch operation part 62a just comes above the contact piece 70a of the switch 70. A member 64 is a retaining member arranged to prevent the spring 63 and the lever 62 from pulling out off the member 61.

A cassette loading/unloading detection lever 66 is formed approximately in an L shape and is provided with a cassette sensing piece 66a at the fore end thereof. A shaft 67 pivotally carries the lever 66. A spring 68 is arranged to urge the lever 66 to turn counterclockwise as viewed on the drawing. The cassette sensing piece 66a is thus pushed by the spring 68 to protrude toward the holder 31 through a hole 11b provided in the top board of the chassis 11. Further, the lever is provided with a downward protrudent part 66b which is arranged to abut on the arm part 62c of the switch operation lever 62; a downward pushing part 66c which is arranged to push downward the arm part 62c of the lever 62; and a switch operation part 66d which is arranged to push down the contact piece 69a of the switch 69.

The switch 69 is a normally-open type cassette presence/absence detecting switch. When the apparatus is loaded with no cassette, the cassette loading/unloading detection lever 66 is turned counterclockwise by the spring 68. Then, the switch operation part 66d pushes the contact piece 69a of the switch 69 to move it away from the contact piece 69b. The switch is thus brought into an OFF state. When the apparatus is loaded with the cassette 1, the lower side of the cassette 1 turns round the sensor piece 66a of the lever 66 clockwise as shown in FIGS. 15B and 15C. Then, the contact pieces 69a and 69b of the switch 69 come into contact with each other to bring the switch 69 into an ON state.

The switch 70 is a normally open type cassette loading/unloading detecting switch. The switch 70 turns on when the switch operation part 62a of the switch operation lever 62 pushed down the contact piece 70a to bring it into contact with another contact piece 7b.

A gear 71 is rotatably carried by a shaft 72 to rotate according as the head 5 is shifted by a head shifting device which will be described later herein. A reset lever 73 is provided with an uprising part 73a. When the head 5 is shifted to a given position outside of a predetermined recording area on the magnetic disc 2 by the head shifting device, the uprising part 73a pushes the tail end 62b of the switch operation lever 62 to turn round clockwise against the force of a spring 63 until the arm part 62c of the lever 62 comes to part from the pushing-down part 66c of the cassette loading/unloading detection lever 66.

In loading the apparatus with the cassette 1, the outer cover 35 is first opened by turning it round counterclockwise on the hinge shaft 12 with the aid of the urging force of the spring 14 relative to the body chassis 11. Then, the outer cover 35 comes to a stop with one end 35b coming to abut on the wall 11a of the chassis. In this instance, the holder 31 which is under the urging force of the spring 13 tries to turn round clockwise relative to the outer cover 35. However, this is prevented by the hook member 40 of the outer cover 35 which then restricts the holder to its position as shown in FIG. 15A.

When the outer cover 35 and the holder 31 are in the open state as shown in FIG. 15A, the clamping lever has its hook part 18b in a state of engaging the claw part 21d of the lock lever 21. The bent part 21c of the lock lever 21 is then abutting on one end 23c of another lock lever 23. The two lock levers 21 and 23 are thus in a state of having been shifted to the right into an interlocked position. The claw parts 21a, 23a, 21b and 23b of the two lock lever 21 and 23 are located outside of the moving loci of the lock pins 36a and 36b erected on the outer cover 35. Under this condition, the above stated lock completion detecting switch 74 has its contact pieces 74a and 74b staying away from each other.

Further, under this condition, as shown in FIG. 17, the cassette loading/unloading detection lever 66 is in a state of having been turned round counterclockwise by the force of the spring 68. Therefore, the switch operation lever 62 is released from the restriction imposed by the downward extending part 66b of the detection lever 66 and is allowed to be turned round counterclockwise by the force of the spring 63 until its tail end 62b comes to impinge on the pin 65. Then, the switch operating part 62a of the lever 62 is positioned immediately above the contact piece 70a of the cassette loading/unloading detecting switch 70. Meanwhile, the cassette presence/absence detecting switch 69 has its contact pieces 69a and 69b parted from each other with the former pushed down by the switch operating part 66d of the lever 66.

Again referring to FIG. 15A, with the cassette 1 inserted into the holder 31 via its opening part 31f under the illustrated condition, when the outer cover 35 is turned round clockwise on the hinge shaft 12 against the urging force of the spring 14, the holder 31 also turns round in the same direction on the hinge shaft 12. Then, when they come to a point where a cassette and disc loading action is completed as shown in FIG. 15C, the spindle 6 enters the engaging hole 3c of the center core 3 of the magnetic disc 2 through the aperture 31c of the holder 31. The lower and upper stabilizer plates 15 and 37 also enter the apertures 1b and 1a through the apertures 31b and 31a of the holder 31 respectively. Then, when the outer cover 35 is pushed further in the direction of arrow as shown in FIG. 15B from the cassette and disc loading completed position of FIG. 15C, the center core 3 of the magnetic disc 2 is urged to move to the spindle 6 by the fore end projection 38a of the leaf spring 38 attached to the outer cover 35. The lower surface of the center core 3 then comes into contact with the flange face 6b of the flange part 6a of the spindle 6. At that time, a difference between the pushed extent of the outer cover 35 and a necessary extent to which the center core 3 is to be pushed down is absorbed by the flexion of the leaf spring 38.

With the cassette 1 inserted in the holder 31, the lower side of the cassette 1 pushes the cassette sensor piece 66a of the cassette loading/unloading detection lever 66 shown in FIG. 17 under the condition which obtains as shown in FIGS. 15B and 15C. This causes the lever 66 to turn round clockwise against the force of the spring 68. Then, the pushing-down part 66c of the lever 66 pushes the arm part 62c of the switch operation lever 62. The switch operating part 62a of the lever 62 then pushes the contact piece 70a of the cassette loading/unloading detecting switch 70 to bring it into contact with the contact piece 70b. The switch 70 is thus turned on. At that time, the cassette presence/absence detecting switch 69 is released from the depressing action of the lever 66 on its contact piece 69a and is allowed to turn on by itself. If the cassette 1 is not inserted in the holder 31, the detection lever 66 is not turned round clockwise. In that event, therefore, both the switches 69 and 70 are left in their OFF states.

As described in the foregoing, the embodiment is arranged to store information about removal of the cassette 1 by turning round the switch operation lever 62 to a position where its arm part comes beneath the pushing-down part 66c of the cassette loading/unloading detection lever 66. A memory signal for this is obtained in the form of an ON state of the cassette loading-/unloading detecting switch 70 by setting the arm part of the lever 62 with the arm part pushed down together with the outer cover 35 to a state as shown in FIGS. 15B and 15C and with the cassette 1 placed within the holder 31.

When the outer cover 35 is pushed in as shown in FIG. 15B, the lock pins 36b which is one of two lock pins 36a and 36b provided on the outer cover 35 comes to push down the tail end 18a of the clamping lever 18. This causes the lever 18 to turn round counterclockwise on the shaft 17 against the force of the spring 19. The hook part 18b is thus disengaged from the claw part 21d of the lock lever 21. This disengagement allows the lock lever 21 to be moved by the urging force of the spring 22 to the left as shown in FIG. 16B. Then, the claw parts 21a and 21b of the lock lever 21 come to the upper ends of the lock pins 36a and 36b. The side edge part of the claw part 23a or 23b of the lock lever 23 comes to impinge on one side part of the lock pin 36a or 36b. This prevents the lock lever 21 from being moved to the left by the spring 24. The lock lever 23 is thus stopped while the other lock lever 21 is moving. After this, when the outer cover 35 is released from a pushing operation performed thereon, the urging force of the spring 14 tries to turn round the cover 35 counterclockwise on the hinge shaft 12. At this time, however, the lock pins 36a and 36b engages the claw parts 21a and 21b of the lock lever 21 to inhibit the cover 35 from turning. Further, at this time, the lock lever 23 is caused by the urging force of the spring 24 to move to the left until the leftward move is prevented by the bent part 21c of the lock lever 21. As a result, the claw parts 23a and 23b engage the lock pins 36a and 36b respectively as shown in FIG. 16C. In other words, the outer cover 36 is thus secured to the body chassis 11 at that point of time. Under this condition, the switch control arm 23d of the lock lever 23 turns the lock completion detecting switch 74 into an ON state by bringing its contact piece 74a into contact with its another contact piece 74b. Further, the fore end projection 83a of the leaf spring 38 attached to the outer cover 35 parts from the center core 3 as shown in FIG. 15C. The magnetic disc 2 is thus adequately mounted on the spindle 6 and is ready to be rotated by the rotation of the spindle 6.

In taking out the cassette 1, the bent part 21e of the lock lever 21 protruding from the slot-like opening 16a provided in the side plate 16 is pushed to the right against the forces of the springs 22 and 24 (see FIG. 16C). This brings the lock lever 21 into a state of being locked by the clamping lever 18 as shown in FIG. 16A. The lock lever 23 then comes back to its original position to open the switch 52. At the same time, the outer cover 35 and the holder 31 are brought into the state of FIG. 15A by the actions of the springs 13 and 14. Further, in this instance, the switch 120 turns on soon after the lock lever 21 is operated.

In FIGS. 15A, 15B and 15C, a reference numeral denotes a cassette positioning member. This member 43 is disposed in the bottom part within the holder 31. A leaf spring 44 or the like is preferably arranged, for example, on the ceiling part of the outer cover 35 to push the cassette 1 toward the positioning member 43 when the outer cover 35 is closed. In a modification of the above stated cassette and disc loading device, the holder 31 is omitted and, in place of the holder, a fixed cassette receiving part is formed, within a space on the chassis 11 between the hinge shaft 12 and the side plate 16, in the shape of a frame or the like corresponding to the cassette 1. The cassette 1 then can be put into the cassette receiving part. In the case of this modification, the outer cover 35 is provided, for example, with some elastic member which is made of a leaf spring, a sponge material or a soft rubber material and is arranged to push the cassette 1 against the body chassis while the outer cover 35 is in a locked state, so that the cassette 1 can be kept in a state of being fixed to the chasis 11. Further, in that instance, it is preferable to add some ejecting means which is arranged to eject the cassette 1 from the cassette receiving part in response to an opening action performed on the outer cover 35.

Further, in an example of modification of the memory or storing means shown in FIG. 17, only the switches 60 and 70 and the gear 71 are disposed on the side of the body chassis while the operation lever 62 and the detection lever 66 are disposed on the reverse side of the holder 31 in the manner as shown in FIG. 17. The cassette sensor piece 66a of the detection lever 66 is arranged to enter into the holder 31 through the aperture 31g of the holder 31. The levers 66 and 62 are thus arranged to become operable on the switches 69 and 70 when the holder 31 and the outer cover 35 are set in the states as shown in FIGS. 15B and 15C. In this instance, a reset lever 73 may be arranged to act on the lever 62.

Figure 18:
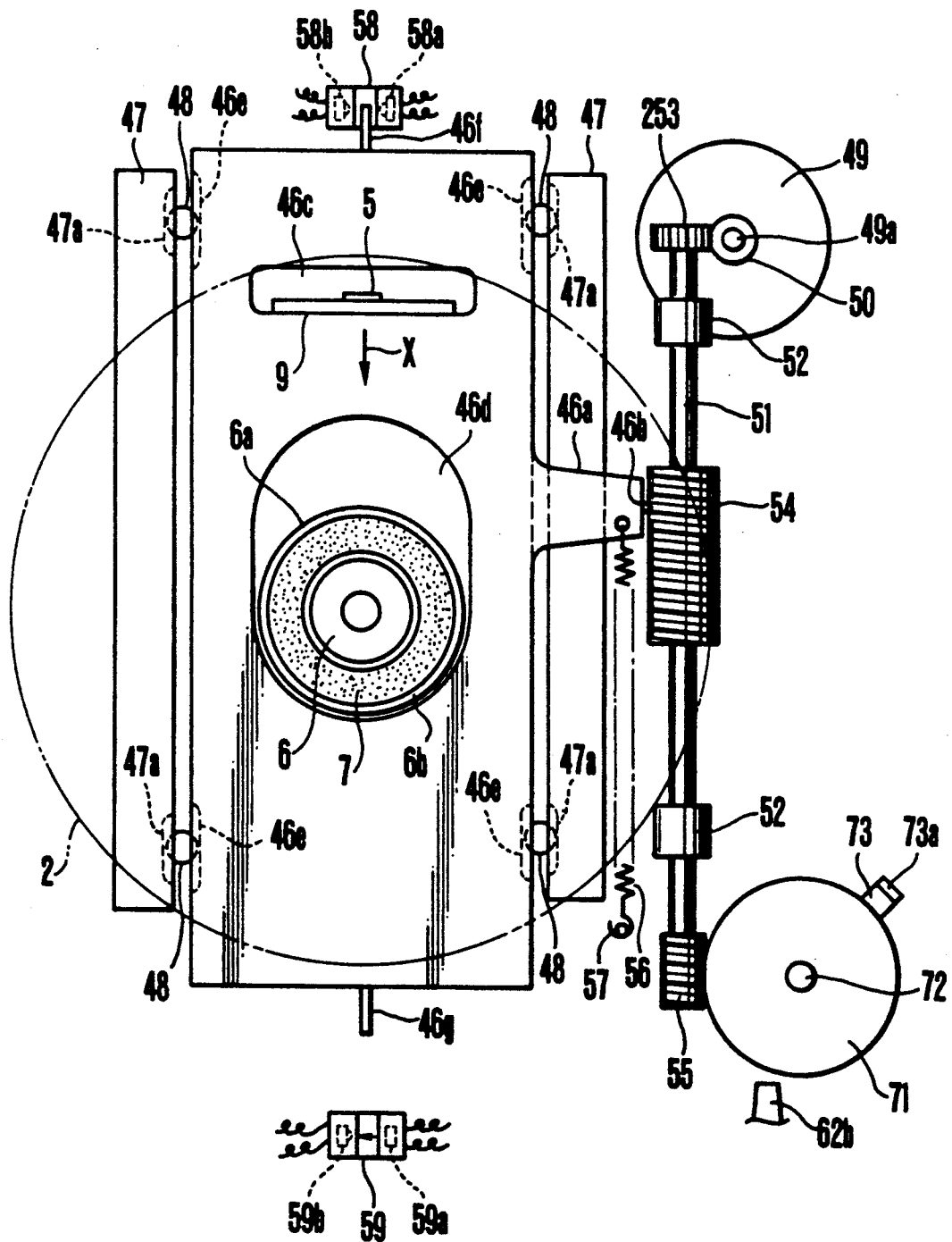
FIG. 18 is a plan view showing an embodiment of this invention and particularly a device thereof for shifting a head.

Referring now to FIG. 18, the magnetic head shifting device is arranged as described below:

The magnetic head 5 is secured to a slot part 46c of a head carrier or carriage 46 via a head mount plate 9. The head carrier 46 is arranged to be guided through sliding balls 48 by guide rails 47 and to be slidable along the guide rails 47. The balls 48 are inserted in between V-shaped grooves 46e and 47a formed along the edges of the guide rails 47 and those of the head carrier 46. A slot 46d is provided in the head carrier 46 for an escape from the spindle 6. The head carrier 46 has an engaging part 46b which is arranged at the fore end of the arm part 46a of the head carrier 46 to engage a head shifting screw 54. A back-lash removing spring 56 is provided in between the arm part 46a and a fixed pin 57. The spring 56 urges the carrier 46 in the direction of arrow X, or downward as viewed on the drawing, and is arranged to remove any back-lash of engagement between the engaging part 46b and the screw 54.

The screw 54 is mounted on the shaft 51 in the middle part thereof and is rotatably carried by a bearing 52. Worm wheels 53 and 55 are mounted on the two ends of the shaft 51. The worm wheel 53 engages a worm gear 50 which is mounted on the output shaft 49a of the head shifting stepping motor 49. Meanwhile, the worm gear 55 engages the gear 71 which is shown in FIG. 17.

Therefore, when the stepping motor 49 rotates, its rotation is transmitted via the engagement of the worm gear 50 and the worm wheel 53 to the shaft 51. This causes the screw 54 to rotate. The carrier 46 is then moved through the engagement of its engaging part 46b and the screw 54 to an extent according to the lead of the screw 54. In that instance, the moving direction of the carrier 46 is determined by the rotating direction of the motor 49. The shifting extent of the head carrier 46 corresponding to the unit track pitch on the disc 2 is determinable by a number of steps of rotation of the motor 49. The gear 71 is rotated through the worm gear 55.

Detectors 58 and 59 are arranged to detect that the head 5 comes to the outsides of a given recording area of the disc 2 on the peripheral side and the center side thereof. Each of the detectors is arranged in the same manner as the arrangement of a known photo coupler consisting of a light emitting element 58a or 59a and a light receiving element 58b or 59b and is arranged to detect a light shielding plate 46f or 46g which is mounted on the head carrier 46.

The description given hereinafter is on the assumption that the disc 2 is arranged to have a total of 50 recording tracks formable within the given recording area thereof at a predetermined pitch of, for example, 100 μm. These recording tracks are numbered in sequence from 1 to 50 from the peripheral side to the central side of the disc. In this case, the detector 58 is arranged to detect the light shielding plate 46f when the head 5 is shifted to a position one track pitch distance closer to the periphery of the disc than the first track (hereinafter this position is referred to as the 0-th track position for the sake of convenience). The other detector 59 is arranged to detect the light shielding plate 46g when the head 5 is shifted to a position one track pitch distance closer to the center of the disc than the 50th track (hereinafter that position is referred to as the 51st track position). Further, the gear 73 is arranged to be rotated clockwise (counterclockwise as viewed on FIG. 17) when the head carrier 46 is to be moved in the direction of arrow X of FIG. 18 and to be rotated counterclockwise (clockwise in the case of FIG. 17) when the head carrier 46 is to be moved in the direction reverse to the direction of arrow X. In that case, the reset lever 73 is arranged to disengage the arm part 62c of the switch operation lever 62 from the pushing-down part 66c of the detection lever 66 by pushing the tail end 62b of the lever 62 with its uprising part 73a when, for example, the head 5 is shifted to an extent corresponding to five track pitches (5 TPs) further toward the central side of the disc from the above stated 51st track position. Further, the head carrier 46 is moved in the direction of arrow X by the forward rotation of the stepping motor 49 and in the reverse direction by the reverse rotation of the motor.

Figure 19:
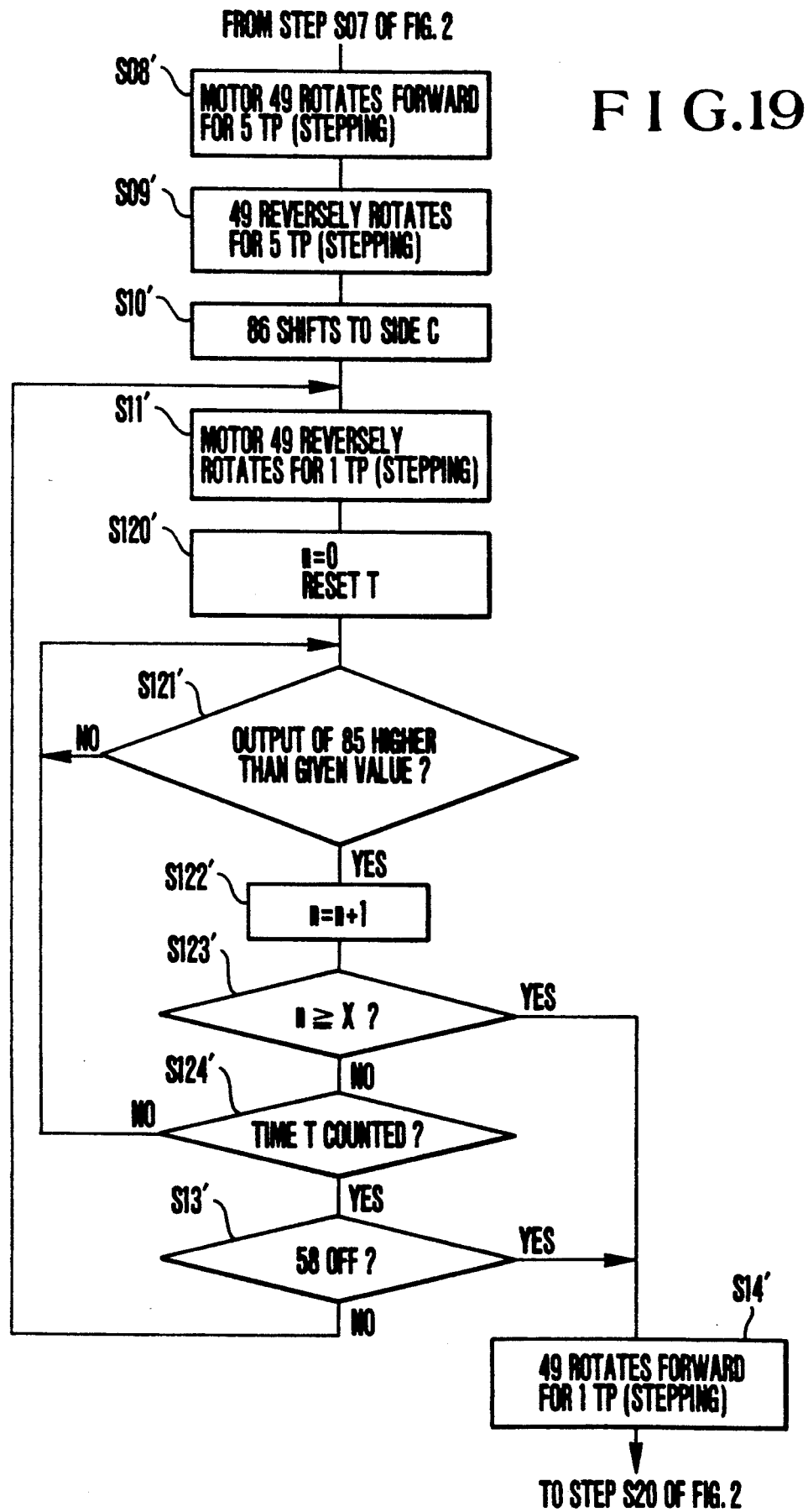
FIG. 19 is a flow chart showing the control flow of a recording preparatory operation of a system controller 91.

Referring to FIG. 19, an example of modification of the flow of operation shown in FIG. 2 is described as follows: The description places emphasis on the steps arranged to increase the accuracy and speed of the check made at the step S09 of FIG. 2 for the presence or absence of a record existing on the magnetic disc 2.

In the modification shown in FIG. 19, a step S08' follows the step S07 of FIG. 2 while a step S20 follows the step S14' of FIG. 2. Other steps of this modification are similar to the corresponding steps of FIG. 2 and, therefore, are omitted from description given here. After the step S07 of FIG. 2, the flow comes to the step S08', at which the controller 91 instructs the driving circuit 87 to have the motor 49 immediately make stepwise forward rotation to an extent corresponding to five TPs (5 track pitch distance) in the direction of arrow X. The reset lever 73 of FIG. 17 then causes the switch operation lever 62 to turn round clockwise. The arm part 62c of the lever 62 then moves away from the pushing-down part 66c of the cassette loading/unloading detection lever 66. Then, the cassette loading/unloading detecting switch 70 comes back to its OFF state. Meanwhile, the spring 63 acts to bring the arm part 62c of the operation lever 62 back to its neutral position where the downward-extending part 66b of the detection lever 66 can impinge upon the arm part 62c. After that, therefore, the operation lever 62 no longer acts on the switch 70 with the downward-extending part 66c of the detection lever 66 impinging thereon even when the lever 62 is released from the pressure of the reset lever 73.

After the stepping motor 49 has made the stepwise forward rotation to the extent of five TPs, the controller 91 instructs the driving circuit 87, at the step S09', to cause the motor 49 to make stepwise reverse rotation in the direction reverse to the direction of arrow X. This brings the head 5 to the 51st track position on the disc 2. The flow of operation then comes to a step S10'.

Step S10': The controller 91 causes the changeover switch 86 to shift its connecting position on the side of the terminal C thereof. Step S11': Under this condition, the controller instructs the driving circuit 87 to have the motor 49 shift the head 5 to an extent of one TP in the direction reverse to the direction of arrow X by reversely rotating stepwise. The head 5 is thus set in the 50th track position. Step S120': After that, the flag n is set at n=0 and the timer T is reset. Under this condition, the record presence/absence detecting circuit 85 is in connection with the head 5 via the changeover switch 86. The detecting circuit 85 detects, at the timing of the FG pulses, the presence or absence of any existing record on the disc 2 (in the 50th track in this instance) on the basis of a signal picked up by the head 5. The circuit 85 then produces a signal at a high level in case of the presence of an existing record and at a low level if no existing record is detected. Step S121': The controller 91 checks the level of the output of the above stated detecting circuit 85 upon receipt of every FG pulse. If the output level is found to be high, the flow of operation comes to a step S122'. Step S122': One is added to a number n of high level parts of the output every time a high level part is found. Step S123': When this number n becomes n≧x, the track checked is considered to have an existing record and the flow comes to a step S14'. In the event of n<x, however, the flow proceeds to a step S124'. Step S124': A check is made to see if the period of time T required for one turn of the disc has lapsed. If not, the flow comes back to the step S121'. If the time T is found to have lapsed, the track under the check is considered to have no existing record and the flow proceeds to a step S13'. Step S13': A check is made to see if the carrier position detector 58 of FIG. 6 (or its light receiving element 58b) has been turned off by the light shielding plate 46f for the purpose of confirming the arrival of the head 5 at the 0-th track position. If not, the flow comes back to the step S11' to again give the instruction to have stepwise reverse rotation of the motor 49 for shifting the head to the extent of one TP in the direction reverse to the direction of arrow X. In this instance, the value x indicated above represents an integer which is smaller than the number of FG pulses obtained per turn of the disc. In the case of this specific embodiment, the number of FG pulses per turn of the disc is arranged to be 15 and the value x is set at 5. The steps S11', S120' to S124' and S13' are repeated until either there obtains the state of n≧x or the detector 58 turns off. After that, the flow comes to a step S14'. Step S14': An instruction is given to have the motor 49 make stepwise forward rotation for shifting the head 5 to the extent of one TP in the direction of arrow X, because: The state of n≧x indicates the arrival of the head 5 at a recorded track located in the last place among the recorded tracks on the disc 2 counting them in the sequence of track numbers. Therefore, when the flow of operation comes from the step S123' to the step S14', the head 5 is set at an unrecorded track located immediately adjacent to the last of the recorded tracks. In other words, in this instance, some of the tracks on the disc 2 have already been recorded. Meanwhile, the OFF state of the detector 58 indicates the arrival of the head 5 at the 0-th track on the disc 2. Accordingly, the head 5 is positioned at the first track on the disc 2 when the flow comes from the step S13' to the step S14'. In other words, in that instance, the disc 2 has no existing record. The embodiment shown in FIG. 19 is arranged to drive the motors 49 and 88 by using the (speed signal) FG pulses and to detect the presence or absence of records as mentioned above. The arrangement of this embodiment, therefore, obviates the necessity of forming any special synchronizing signal at a synchronizing signal generator and thus permits simplification of circuit arrangement. If it is necessary to form such a synchronizing signal by means of a microcomputer, the program would become complex. Whereas, the use of the FG pulses in the above stated manner advantageously simplifies the program.

With the head 5 thus having been set at an unrecorded track located immediately after the last of the recorded tracks counting the recorded tracks in the sequence of track numbers, the flow of operation of the controller 91 comes to the step S20 of FIG. 2.

Figure 20:
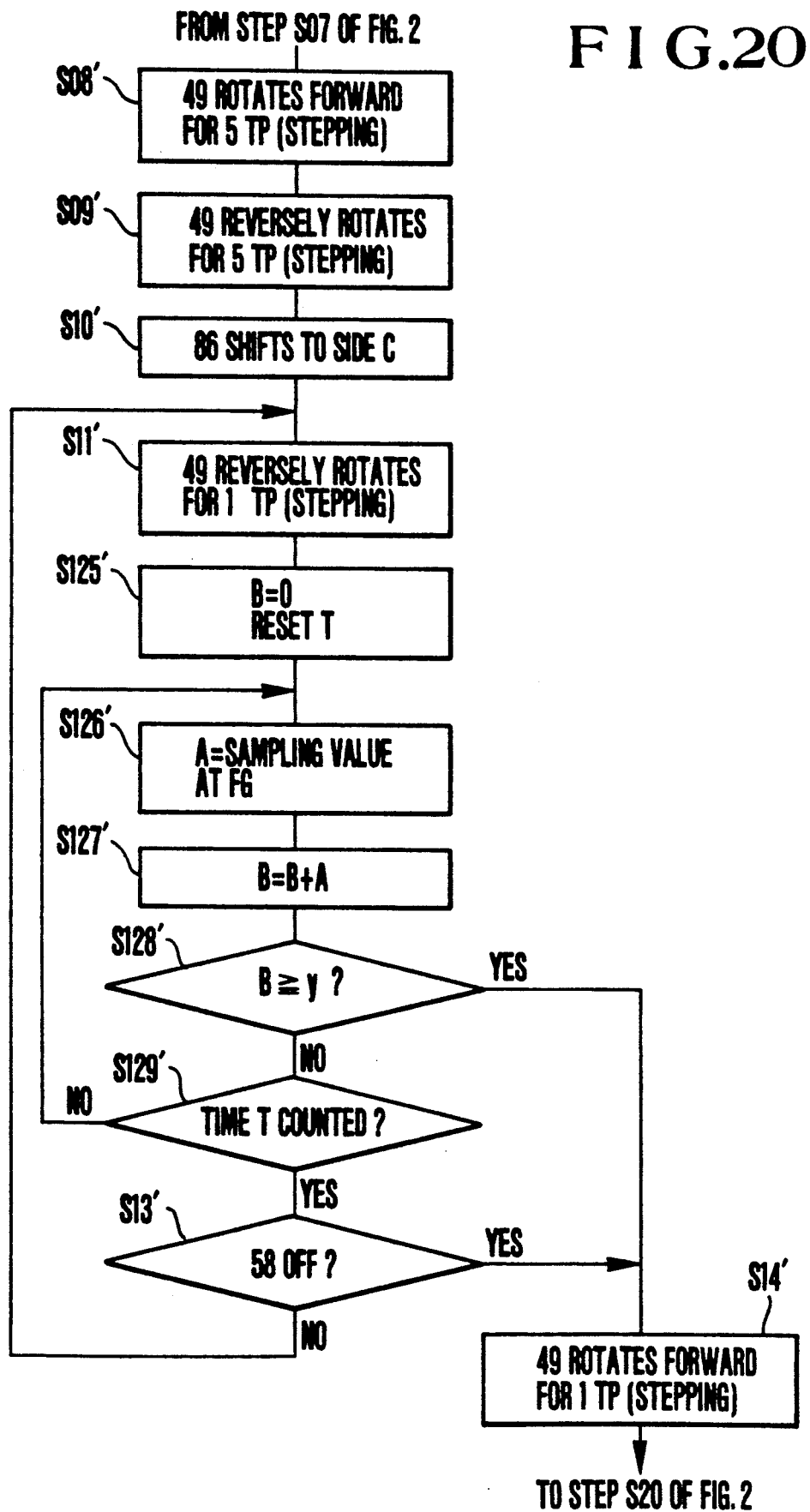
FIG. 20 is a flow chart showing, as a modification of the above stated embodiment, the control flow of the recording preparatory operation of the system controller.

A modification of the flow of operation shown in FIG. 19 is arranged as shown in FIG. 20:

The same steps as those shown in FIG. 19 are omitted from description. Step S125': Following the step S11, the value B is set at B=0 and the timer T is reset. The flow proceeds to a step S126'. Step S126': The RF detection output level is sampled at the timing of the FG pulses for an applicable track. A sampled value obtained at each FG pulse is assumed to be A. Step S127': The value A is added to the value B and is replaced with the value B. Step S128': A check is made to see if the accumulated value B has reached at least a certain level y. If so, the RF is assumed to be present in the track and the flow proceeds to a step S14'. Step S14': The same check is made for a next track. If the accumulated value B has not reached the level, the flow comes to a step S129'. Step S129': A check is made to see if a period of time required for one round of the track has lapsed. If not, the flow comes back to the step S126'. If so, the flow proceeds to the step S13'. Therefore, like in the case of the preceding example of embodiment, a next track can be checked without further examining all the points of the FG pulses in case that the present track is a recorded track. This arrangement shortens a period of time required for detection. The arrangement may be changed to select several points of the FG pulses and to determine the RF to be present if the average of the sampled values is not lower than a given value of the RF level.

In the case of the embodiment shown in FIGS. 19 and 20, the signal levels of varied points within each track are detected one after another; and the track is discriminated as to whether it is a recorded track without waiting for the result of detection of the signal levels at all the points of the track being checked as soon as the result of detection is found to have reached a given reference level. Therefore, a discrimination between a signal recorded track and an unrecorded track can be made in a short period of time. Further, since the presence or absence of signals in the tracks are examined according to the timing of the FG pulses, the operation of the apparatus is not easily affected by a drop-out. Besides, since the embodiment does not necessitate any special synchronizing signal, it permits simplification of its structural arrangement.

Figure 21:
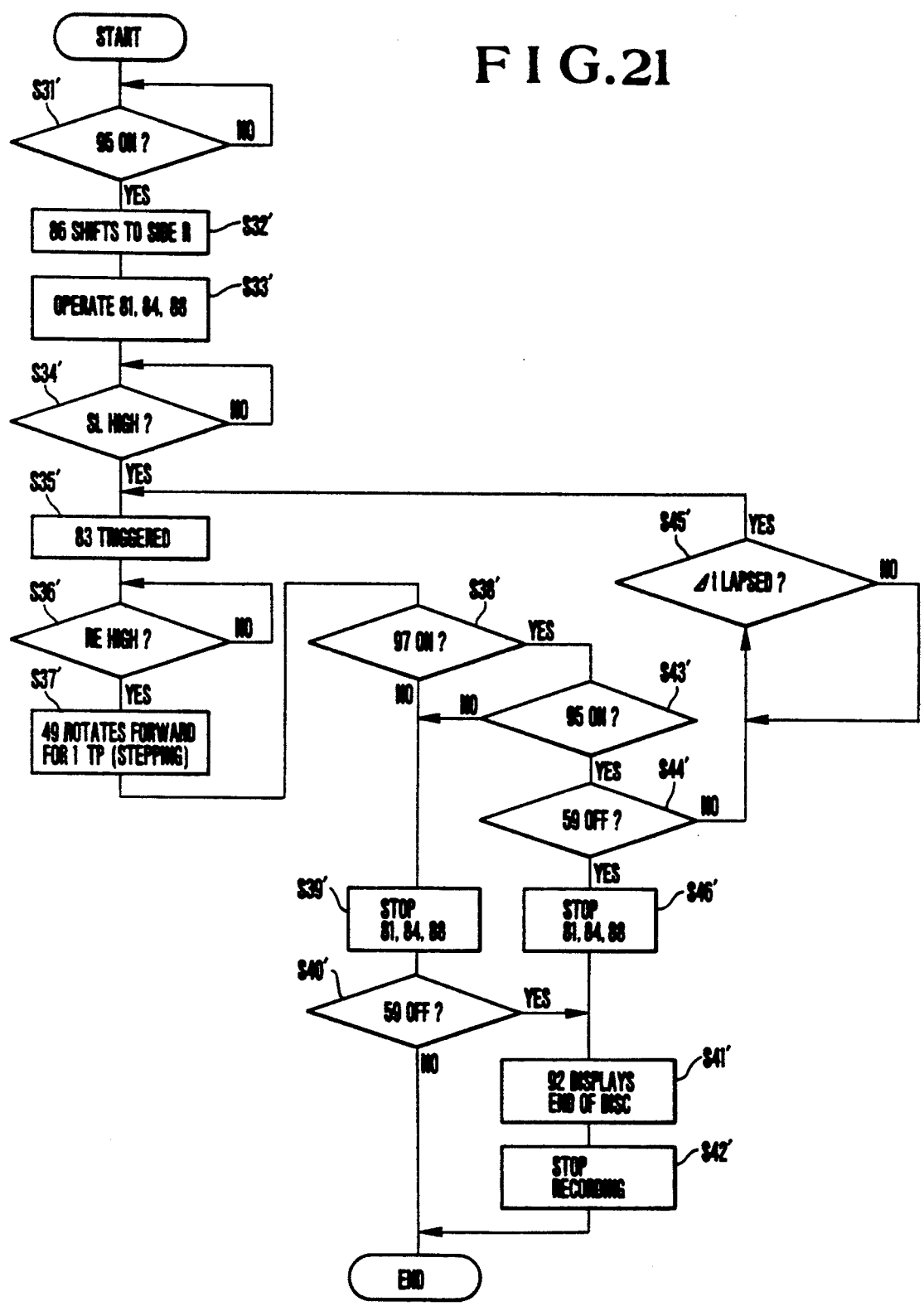
FIG. 21 is a flow chart showing another control flow of the recording preparatory operation of the system controller.

In the foregoing, a video signal recording operation to be performed with the recording trigger switch 95 turned on after the completion of preparation for recording has been described with reference to FIG. 4. In case where the system controller 91 is connected to a mode selection switch 97. The recording operation is performed as described below with reference to FIG. 21:

The mode selection switch 97 is provided for selection between a single shooting mode in which one field or frame portion of video signal is recorded by one performance of operation on the recording trigger switch 95 and a continuous shooting mode in which recording is repeated at a given speed as long as the trigger switch 95 is kept in its ON state. The single shooting mode is selected when the switch 97 is in an OFF state and the continuous shooting mode when the switch 97 is in an ON state. FIG. 21 is a flow chart showing the recording operation to be performed in this instance.

Step S31': After completion of the preparation processes which are performed for recording as described in the foregoing, the controller 91 repeats checking for the ON state of the recording trigger switch 95 brought about by the second step stroke of a depressing operation on the trigger button 96 as long as the power supply remains on. Step S32': When the trigger switch 95 is turned on, the controller 91 shifts the connecting position of the change-over switch 86 to its terminal R. Step S33': Following this, the camera part 81 and the synchronizing signal generating circuit 84 are actuated. At the same time, the motor control circuit 89 is instructed to rotate the disc motor 88. The camera part 81 then comes to produce a video signal in synchronism with the synchronizing signals HS and VS coming from the synchronizing signal generating circuit 84. The recording circuit 82 processes the video signal received from the camera part 81 (frequency modulation, etc.) into a recording signal. Under this condition, the recording gate within the recording circuit 82 is in an OFF state. Therefore, although the head 5 is in connection with the recording circuit 82 via the change-over switch 86, no recording is performed. Meanwhile, the motor control circuit 89 receives the speed signal FG from the motor 88, the rotation phase signal PG from the rotation phase detector 90 and the vertical synchronizing signal VS from the synchronizing signal generating circuit 84. The circuit 89 then controls the rotation of the motor 88 on the basis of these signals in such a manner that the motor 88 rotates the disc 2 at a speed corresponding to the field or frame frequency and at a predetermined phase relative to the vertical synchronizing signal VS. When the motor 88 comes to rotate at the controlled speed and phase, the motor control circuit 89 produces servo-lock-in signal SL at a high level. Step S34': In the meantime, after giving the instruction for the operation of the motor 88, the controller 91 repeats making a check to see if the level of the servo-lock-in signal SL from the control circuit 89 becomes high. Step S35': When the level of the signal SL becomes high, a recording trigger signal is promptly applied to the recording control circuit 83. In response to this, the recording control circuit 83 turns on the recording gate of the recording circuit 82 and have it open for one field or frame period including a vertical synchronizing signal first obtained after receipt of the recording trigger signal on the basis of the synchronizing signals HS and VS coming from the synchronizing signal generating circuit 84. As a result of this, one field or frame portion of a recording signal is applied via the change-over switch 86 to the head 5. The head 5 records the amount of signal on the disc 2 just in one turn of the disc 2 which is rotated by the motor 88. In this instance, the vertical synchronizing signal VS is recorded of course in a rotatory position predetermined relative to the vertical synchronizing signal.

After completion of recording of one field or frame portion of the video signal, the recording control circuit 83 produces a recording completion signal RE at a high level. Step S36': Meanwhile, after the recording is triggered, the controller 91 repeats checking this recording completion signal RE for a high level thereof. Step S37': When its level becomes high, the controller instructs the motor driving circuit 87 to cause the stepping motor 49 to make stepwise forward rotation in such a manner as to bring the head 5 to a next recording position by shifting it to the extent of one TP in the direction arrow X. Step S38': The controller 91 checks the mode selection switch 97 for its ON state. Step S39': If the switch 97 is not in the ON state (thus indicating selection of the single shooting mode), the controller 91 renders the camera part 81 and the synchronizing signal generating circuit 84 inoperative and instructs the motor control circuit 89 to bring the disc motor 88 to a stop. Step S40': Following this, the controller 91 checks the detector 59 to see if it has been turned off by the above stated shift of the head 5. If so, the flow comes to a step S41'. Step S41': The controller 91 causes the display device to make a display indicative of the end of the disc. Step S42': Then, further recording is inhibited. With the switch 97 in the OFF state thus selecting the single shooting mode, the above stated steps of operation are executed every time the recording trigger switch 95 turns on to have one field or frame portion of the video signal recorded in each of different positions on the disc 2 as long as the detector 59 does not turn off.

In case that the mode selection switch 97 is found in its ON state at the step S38' thus indicating selection of the continuous shooting mode, the flow comes to a step S43'. Step S43': The controller 91 checks the trigger switch 95 to see if it is in an ON state. If not, the flow shifts to the previous step S39'. If so, the flow comes to a step S44'. Step S44': A check is made to see if the detector 59 is in its OFF state. If not, the flow comes to a step S45'. Step S45': A wait time is provided for a predetermined period of time Δt required for determining a speed or rate of a continuous recording operation. After the lapse of this wait time, the flow comes back to the previous step S35', at which recording is triggered once again. If the detector 59 is found in its OFF state at the step S44', the flow comes to a step S46'. Step S46': The controller 91, like in the case of the step S39', causes the camera part 81 and the synchronizing signal generator 84 to stop operating. At the same time, an instruction is given for bringing the motor 88 to a stop. After that, the flow shifts to the step S41'.

With the switch 97 in its ON state thus designating the continuous shooting mode, one field or frame portion of the video signal is continuously recorded in each of different recording positions on the disc 2 at the predetermined speed through the above stated steps of operation until the detector 59 turns off as long as the recording trigger switch 95 remains in its ON state.

Further, in this instance, the speed or rate at which the continuous shooting is to be performed is variable by adjusting the wait time Δt which is arranged to be determined at the step S45'.

What is claimed is:

1. A still image pickup apparatus, comprising:
    a) means operable for converting a still image into a still image electrical signal;
    b) means for recording said still image electrical signal on a recording medium;
    c) means operable for driving said recording medium relative to said recording means;
    d) means for detecting loading, unloading and replacement of said recording medium following unloading thereof;
    e) means for determining whether said converting means and said driving means are operable; and
    f) means for inhibiting said driving means from operating when said detecting means detects unloading of said recording medium.

2. An apparatus according to claim 1, wherein said converting means includes:
    an image sensing element; and
    an optical system for imaging a radiation from an object onto said image sensing element.

3. An apparatus according to claim 1, wherein said recording medium is a disc-shaped medium and said driving means rotates said recording medium.

4. An apparatus according to claim 1, wherein said indicating means includes a manual operation member.

5. An apparatus according to claim 1, wherein said inhibiting means includes a CPU.

6. A still image pickup apparatus, comprising:

a) means for converting an image of an object into a still image electrical signal, by using a given electric power, and for recording the still image electrical signal on recording means;

b) means for detecting whether said recording means is and is not loaded in said apparatus and whether said recording means has been reloaded following unloading thereof; and c) controller means for controlling the supply of said electric power in said apparatus on the basis of detection effected by said detecting means.

7. An apparatus according to claim 6, wherein said controller means is arranged to stop the supply of said electric power in said apparatus when said detecting means detects that said recording means is not loaded in said apparatus.

8. An apparatus according to claim 6, wherein said recording means includes:

a recording medium on which said still image electrical signal is to be recorded; and driving means for driving the recording medium.

9. An apparatus according to claim 8, wherein said control means is arranged to stop supplying of electric power to said driving means when detecting means detects that said recording means is not loaded in said apparatus.

10. An apparatus according to claim 6, further comprising:

electric power supply means for supplying said electric power.

11. An apparatus according to claim 6, further comprising:

reproducing means for reproducing the still image electrical signal recorded by said recording means.

* * * * *

UNITED STATES PATENT AND TRADEMARK OFFICE
CERTIFICATE OF CORRECTION

Page 1 of 2

PATENT NO. : 5,227,927
DATED : July 13, 1993
INVENTOR(S) : Nobuo Fukushima, et. al.

It is certified that error appears in the above-indentified patent and that said Letters Patent is hereby corrected as shown below:

Title page,
Item [57], Abstract: Delete entire abstract and substitute --An image pickup apparatus includes a unit for converting an image into an electrical signal, a recorder for recording the electrical signal on a recording medium relative to the recorder, a detector for detecting loading or unloading of the recording medium and an inhibiting unit for inhibiting the driver from operating when the detector detects unloading of the recording medium. An indicator may be included for indicating that the converting unit and the driver are enabled.--
Col. 1, line 23, After "of" insert -- the --
Col. 1, line 41, Change "patent application" to --Patent Application --
Col. 2, line 21, delete "on"
Col. 2, line 23, Change "patent" to -- Patent --
Col. 2, line 24, Change "application" to -- Application --
Col. 3, line 33, After "before" insert -- the --
Col. 9, line 11, Change "areas" to -- area --
Col. 11, lines 17-18, Change "according" to -- accordingly
Col. 12, lines 25-26, Change "according" to -- accordingly
Col. 14, lines 27-29, Change "etc." to -- etc., --
Col. 14, line 43, Change "is it" to -- it is --
Col. 14, line 65, Change "have" to -- has --

UNITED STATES PATENT AND TRADEMARK OFFICE
CERTIFICATE OF CORRECTION

PATENT NO. : 5,227,927
DATED : July 13, 1993
INVENTOR(S) : Nobuo Fukushima, et al.

It is certified that error appears in the above-identified patent and that said Letters Patent is hereby corrected as shown below:

Col. 16, line 50. Change "is" to -- are --
Col. 18, line 9. Delete "of"
Col. 19, line 62. After "In" insert -- a --
Col. 24, line 4. Change "according" to -- accordingly --
Col. 26, line 9. Change "another" to -- other --
Col. 29, line 19. After "head" insert -- 5 --
Col. 30, line 42. After "In" insert -- a --
Col. 30, line 44. Change "97.The" to -- 97, the --
Col. 34, line 7. Change "supplying" to -- the supply --
Col. 34, line 9. Change "means" to -- medium --

Signed and Sealed this

Thirtieth Day of August, 1994

Attest:

BRUCE LEHMAN

Attesting Officer   Commissioner of Patents and Trademarks